(12) United States Patent
Oyobe

(10) Patent No.: US 8,762,481 B2
(45) Date of Patent: Jun. 24, 2014

(54) INFORMATION DISTRIBUTION SYSTEM, TERMINAL APPARATUS USED IN SAME SYSTEM, AND RECORDING MEDIUM ON WHICH INFORMATION PROCESSING PROGRAM IS RECORDED SO AS TO BE COMPUTER READABLE, AS WELL AS INFORMATION PROCESSING METHOD

(75) Inventor: Ryo Oyobe, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1128 days.

(21) Appl. No.: 12/216,201

(22) Filed: Jul. 1, 2008

(65) Prior Publication Data

US 2009/0013026 A1 Jan. 8, 2009

(30) Foreign Application Priority Data

Jul. 6, 2007 (JP) ................................. 2007-178669

(51) Int. Cl.
*G06F 15/16* (2006.01)
*H04L 29/08* (2006.01)
*H04L 12/56* (2006.01)

(52) U.S. Cl.
CPC .......... *H04L 67/104* (2013.01); *H04L 67/1065* (2013.01); *H04L 45/00* (2013.01)
USPC .............................. 709/217; 709/218; 709/219

(58) Field of Classification Search
USPC ........................................................ 709/217
See application file for complete search history.

(56) References Cited

U.S. PATENT DOCUMENTS

| | | | |
|---|---|---|---|
| 2004/0068562 A1* | 4/2004 | Tilton et al. ................ | 709/225 |
| 2005/0267928 A1* | 12/2005 | Anderson et al. ............ | 709/200 |
| 2006/0218167 A1* | 9/2006 | Bosley et al. ................ | 707/100 |
| 2007/0030850 A1* | 2/2007 | Grosse .......................... | 370/392 |
| 2007/0115844 A1* | 5/2007 | Basu et al. .................... | 370/252 |
| 2007/0283043 A1 | 12/2007 | Kiyohara et al. | |

FOREIGN PATENT DOCUMENTS

| | | |
|---|---|---|
| JP | 2006-101277 A | 4/2006 |
| JP | A-2006-197400 | 7/2006 |
| JP | 2006-260430 A | 9/2006 |

OTHER PUBLICATIONS

May 31, 2011 Office Action in Japanese Patent Application No. 2007-178669 (with partial English Translation).

* cited by examiner

*Primary Examiner* — Glenton B Burgess
*Assistant Examiner* — Angela Nguyen
(74) *Attorney, Agent, or Firm* — Oliff PLC

(57) ABSTRACT

An information distribution system which, even when the number of participating terminal apparatuses increases, can easily manage an operating history of each terminal apparatus. The information distribution system includes a routing table which includes correlated identification information of one portion of terminal apparatuses among a plurality of terminal apparatuses configuring the information distribution system, and location information of terminal apparatus corresponding to the identification information; a section which transmits an operating history of its own apparatus to another terminal apparatus; a section which stores information on an operating history of another terminal apparatus, transmitted from the other terminal apparatus; a section which, when storing the information on the operating history, transmits a registration message including location information of its own apparatus, based on the routing table; and a section which stores location information of another terminal apparatus included in the registration message when a message received is the registration message.

14 Claims, 22 Drawing Sheets

Fig. 4

| PREFIX | | -0- | -1- | -2- | -3- |
|---|---|---|---|---|---|
| LEVEL 1 | TERMINAL ID | 0100 | (1XXX) | 2133 | 3213 |
| | IP ADDRESS | 10.123.20.73 | | 51.10.20.13 | 41.120.10.23 |
| LEVEL 2 | TERMINAL ID | 1003 | (11xx) | 1221 | 1313 |
| | IP ADDRESS | 21.10.210.13 | | 21.13.21.13 | 11.130.20.143 |
| LEVEL 3 | TERMINAL ID | 1103 | 1110 | 1122 | (113X) |
| | IP ADDRESS | 41.10.217.3 | 111.12.20.1 | 61.11.20.13 | |
| LEVEL 4 | TERMINAL ID | 1130 | 1131 | 1132 | (1133) |
| | IP ADDRESS | 121.150.10.13 | 216.11.210.11 | 210.10.10.13 | |

Fig. 6

CONTENTS INDEX TABLE

|   | CONTENTS ID | TERMINAL ID | IP ADDRESS |
|---|---|---|---|
| 1 | 3020 | 0213 | 60. 32. 72. 101 |
| 2 | 3020 | 1002 | 221. 172. 2. 21 |
| 3 | 3020 | 1301 | 100. 23. 156. 1 |
| 4 | 3020 | 2113 | 60. 32. 72. 103 |
| 5 | 3020 | 2333 | 192. 168. 0. 21 |
| 6 | 3020 | 3210 | 221. 173. 2. 22 |
| 7 | 3020 | 0312 | 152. 105. 11. 123 |

Fig. 10

LOG INDEX TABLE

|   | LOG ID | TERMINAL ID | IP ADDRESS |
|---|---|---|---|
| 1 | 3113 | 1133 | 85. 62. 76. 151 |
| 2 | 3113 | 0221 | 221. 132. 5. 145 |
| 3 | 3113 | 3330 | 64. 213. 16. 13 |

INFORMATION DISTRIBUTION SYSTEM, TERMINAL APPARATUS USED IN SAME SYSTEM, AND RECORDING MEDIUM ON WHICH INFORMATION PROCESSING PROGRAM IS RECORDED SO AS TO BE COMPUTER READABLE, AS WELL AS INFORMATION PROCESSING METHOD

CROSS-REFERENCE TO RELATED APPLICATION(S)

This application is based on and claims the benefit of priority from Japanese Patent Application No. 2007-178669 filed on Jul. 6, 2007; the entire contents of which are incorporated herein by reference.

BACKGROUND OF THE INVENTION

1. Field of the Invention

The present invention relates to an information distribution system, a terminal apparatus used in the same system, and a recording medium on which an information processing program is recorded so as to be computer readable, as well as to an information processing method, and relates in particular to an information distribution system which, being formed by a participation of a plurality of terminal apparatus mutually connected via a network, carries out a transmission and reception of contents information among the terminal apparatus, a terminal apparatus used in the same system, and a recording medium on which an information processing program is recorded so as to be computer readable, as well as to an information processing method.

2. Description of the Related Art

In recent years, along with a spread of a broadband, an information distribution service which distributes contents information such as music data, movie data and the like has become popular. For example, a service which distributes contents information in response to a request from a user, as with a VOD (Video On Demand), has been known.

With this kind of information distribution service, a distribution format according to a server client method has been mainstream, but recently, a P2P (Peer to Peer) type distribution format, which transmits and receives contents information among terminal apparatus, is attracting attention as a new distribution format replacing this method.

The P2P type information distribution system, being formed by a participation of a plurality of terminal apparatus (node apparatus) mutually connected via a network, acquires contents information which a user of a certain terminal apparatus is attempting to acquire from another terminal apparatus which holds one portion of, or all of, the contents.

For example, with an information distribution system described in Japanese Unexamined Patent Publication No. 2006-197400, it not being the case that each terminal apparatus is aware of location information (an IP address or the like) of all terminal apparatus participating in the information distribution system, it holds only location information of one portion of the terminal apparatus acquired at a time of participating or the like and, based on such location information, carries out a search for contents information, and carries out a transmission and reception of the contents information among the terminal apparatus.

SUMMARY OF THE INVENTION

In a P2P type information distribution system, in order to improve a service quality, it is desirable to ascertain an operating condition of each terminal apparatus. For example, by managing information on an operating history (hereafter, also called a "log"), such as an acquisition (downloading) time and date, a reproduction time and date and a transmission (uploading) time and date of contents information in each terminal apparatus, and error information and, referring to the operating history, clarifying a cause of a problem occurring in the terminal apparatus or system, and carrying out a countermeasure thereto, it is possible to provide an information distribution system with an improved service quality.

As a method of managing the operating history of each terminal apparatus, there is a method which disposes a log management server on a network, and causes the operating history to be transmitted to the log management server from each terminal apparatus.

However, with this method, an increase in a quantity of terminal apparatus participating in the information distribution system leads to a proportionate increase in a process load of the log management server, a compression of a log storage area (storage), a compression of a network area to which the log management server is connected, and the like. For this reason, maintenance costs for installing a plurality of log management servers, increasing a capacity of the log storage area, and the like, are necessary.

Consequently, it is desirable that, even when the quantity of terminal apparatus participating in the information distribution system increases, it is possible to easily manage the operating history of each terminal apparatus.

According to an embodiment of the invention, there is provided an information distribution system wherein a terminal apparatus in an information distribution system which, being formed by a plurality of terminal apparatus, mutually connected via a network, to each of which unique identification information is allotted, carries out a transmission and reception of contents information among the terminal apparatus, includes a routing table storage section which stores a routing table in which is correlated identification information of one portion of terminal apparatus among the plurality of terminal apparatus configuring the information distribution system, and location information of terminal apparatus corresponding to the identification information; an own apparatus information transmission section which transmits information on an operating history of its own apparatus to another of the terminal apparatus; an information storage section which stores information on an operating history of another of the terminal apparatus, transmitted from the other of the terminal apparatus; a registration message transmission section which, when storing the information on the operating history in the information storage section, takes identification information allotted to the information on the operating history as destination identification information and, based on information stored in the routing table storage section, transmits a registration message including location information of its own apparatus; and a location information storage section which, when a message received via the network is the registration message, stores location information of another terminal apparatus included in the registration message.

BRIEF DESCRIPTION OF THE DRAWINGS

FIG. 4 is one example of a routing table;

FIG. 6 is an example of a contents index table;

FIG. 7 is a diagram showing one example of an aspect of a terminal apparatus which holds contents information being searched for;

FIG. 9 is a diagram showing an example of an aspect of a terminal apparatus holding log information being searched for;

FIG. 10 is an example of a log index table;

DESCRIPTION OF THE PREFERRED EMBODIMENT(S)

Figure 1:
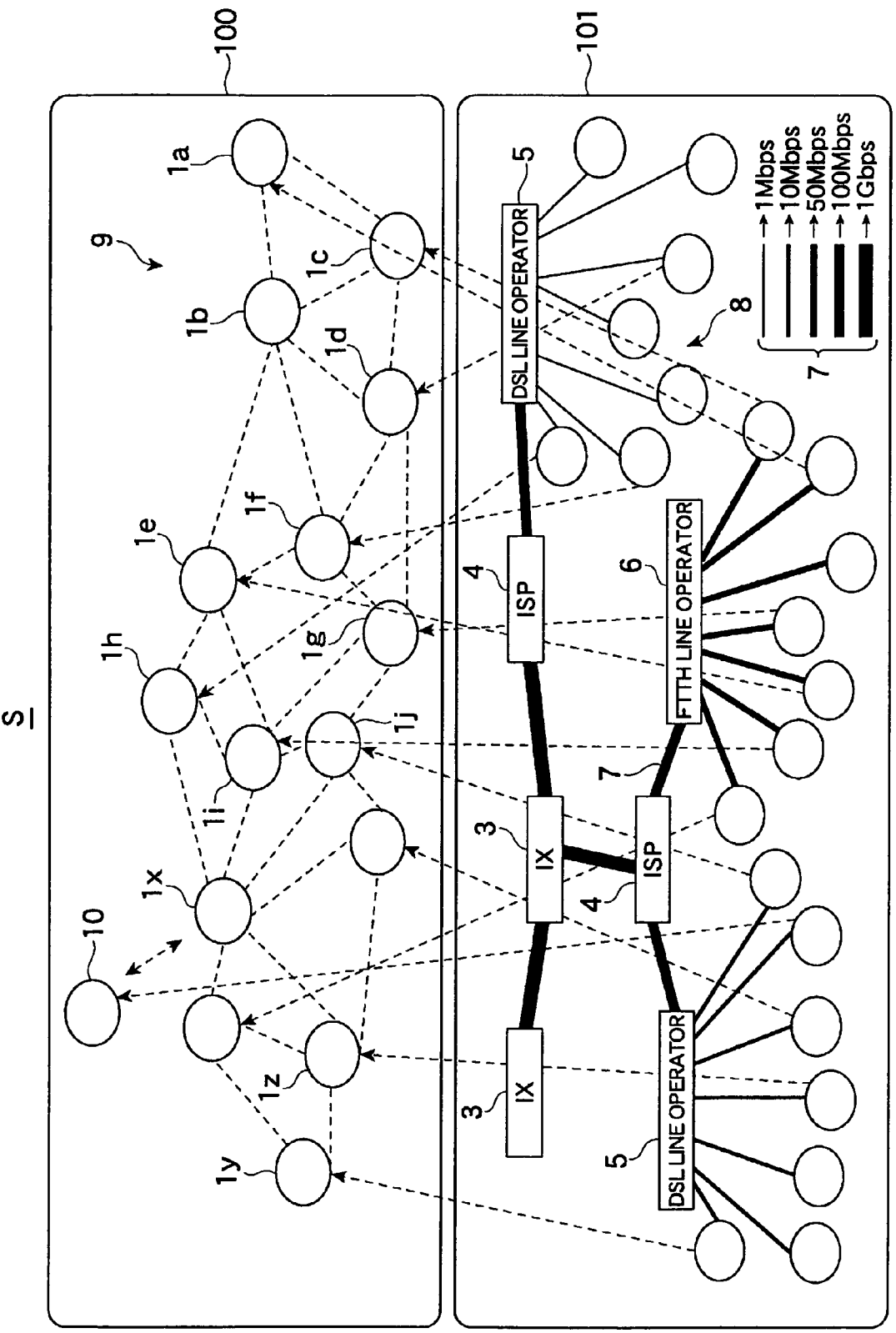
FIG. 1 is a diagram showing an example of a connection aspect of each terminal apparatus in an information distribution system according to a first embodiment.

Hereafter, a description will be given, referring to the drawings, of one embodiment of an information distribution system according to the embodiment of the invention. The information distribution system in the embodiment, being an information distribution system formed by a participation of a plurality of terminal apparatus mutually connected via a network, carries out a transmission and reception of contents information between the terminal apparatus.

Figure 2:
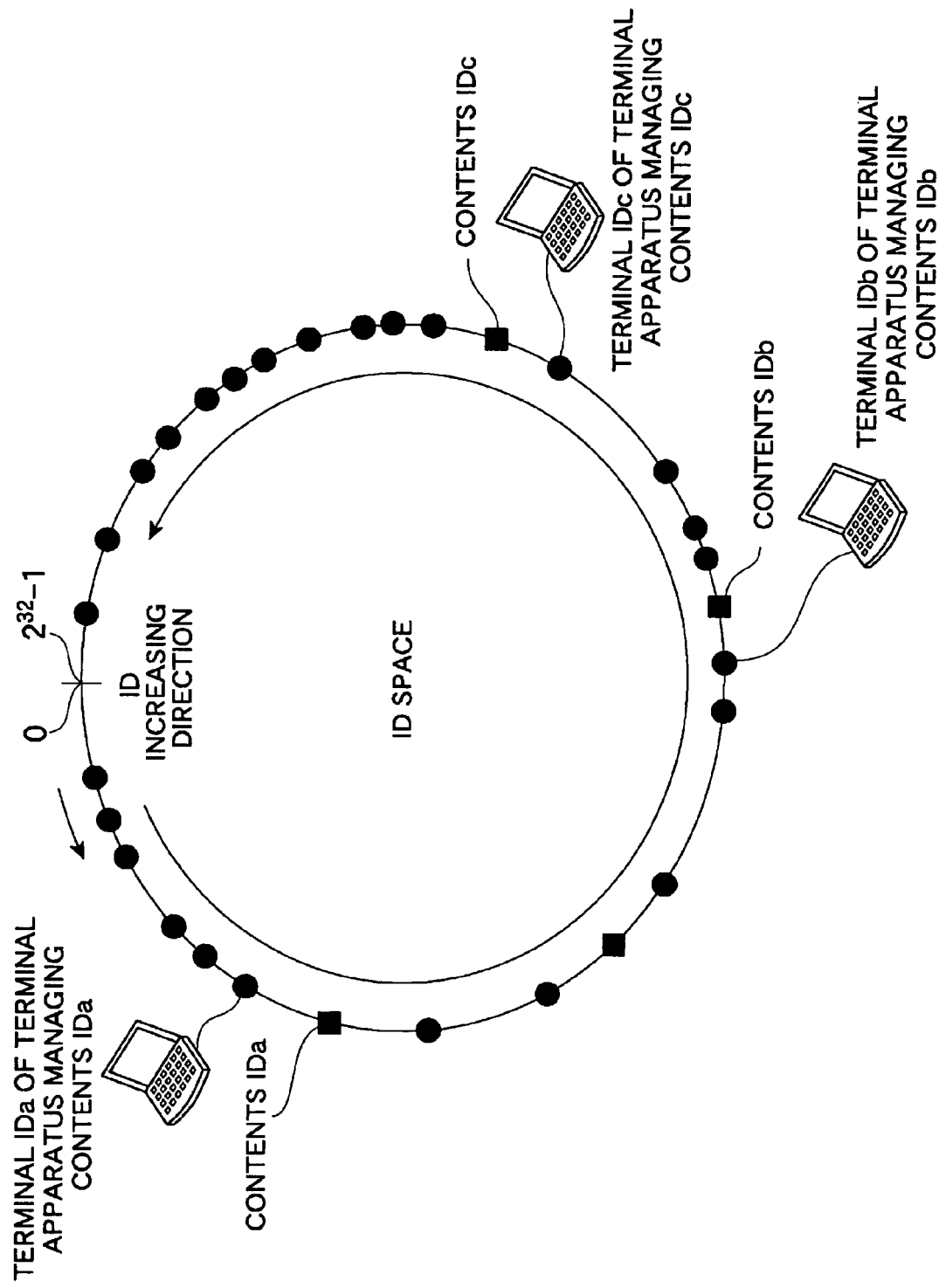
FIG. 2 is an illustration of an ID space.

1. First Embodiment 1.1. Configuration and the like of Information Distribution System S Firstly, a description will be given of an outline of an information distribution system S according to the embodiment, referring to FIGS. 1 and 2. FIG. 1 is a diagram showing an example of a connection aspect of terminal apparatus and a contents introduction apparatus in the information distribution system S according to the embodiment, while FIG. 2 is an illustration of an ID space.

As shown within a lower frame 101 of FIG. 1, a network (a network in the actual world) 8, such as an internet, is constructed of an IX (Internet exchange) 3, an ISP (Internet Service Provider) 4, a DSL (Digital Subscriber Line) provider (a device thereof) 5, an FTTH (Fiber To The Home) provider (a device thereof) 6, and a communication line (for example, a telephone line, an optical cable, or the like) 7.

As shown within an upper frame 100 of FIG. 1, the information distribution system S, being configured including a plurality of terminal apparatus $1a$, $1b$, $1c$ . . . $1x$, $1y$, $1z$ . . . mutually connected via the network 8, is a P2P (peer-to-peer) type of network system. A unique manufacturing number (for example, a MAC address) and IP (Internet Protocol) address are allotted, as information indicating a terminal apparatus, to each terminal apparatus $1a$, $1b$, $1c$ . . . $1x$, $1y$, $1z$ . . . . The manufacturing number and IP address are not duplicated among the plurality of terminal apparatus. Also, in the following description, in a case of indicating any one terminal apparatus among the terminal apparatus $1a$, $1b$, $1c$ . . . $1x$, $1y$, $1z$ . . . , or all of the terminal apparatus, it or they may be referred to as the terminal apparatus 1, for the sake of convenience.

In the information distribution system S of the embodiment, a kind of overlay network 9 shown within the upper frame 100 of FIG. 1 is constructed by an algorithm using a distributed hash table (hereafter called a "DHT"). That is, the overlay network 9 refers to a network configuring a virtual link formed using the already existing network 8, and terminal apparatus 1 disposed on the overlay network 9 are referred to as terminal apparatus participating in the information distribution system S (in other words, participating in the overlay network 9).

A unique number is given to each terminal apparatus 1 as terminal ID, which is an identification number of each terminal apparatus 1 participating in the information distribution system S. In the embodiment, a hash value obtained by hashing a value unique to each terminal apparatus 1, such as the IP address or manufacturing number of each terminal apparatus 1, with a common hash function (a hash algorithm), is taken as the terminal ID of each terminal apparatus 1. As long as the relevant IP address or manufacturing number differs, a probability of terminal ID calculated by hashing with the common hash function in this way having the same value is extremely low. As the hash function is public knowledge, a detailed description will be omitted. Also, in the following description, a value of the IP address (a global IP address) hashed with the common hash function will be taken as the terminal ID.

Also, in the plurality of terminal apparatus 1 participating in the information distribution system S, although contents information (for example, data such as music data, movie data or document data), as common information distributed from one terminal apparatus 1 to other terminal apparatus 1, is stored distributed, an identification number (hereafter called "contents ID"), unique to each item of contents information, is given to the contents information too. Then, the contents ID is made the same length as the terminal ID (for example, 32 bits, or the like), and a contents information name (for example, a data file name) or the like is hashed with the common hash function used when the terminal ID is acquired, and is disposed in the same ID space as the hash value of the terminal apparatus 1 IP address.

In this way, as the terminal ID and contents ID, given respectively to each terminal apparatus 1 and each item of contents information, are generated by the common hash function, it is possible to think of them existing scattered, with no particular bias, on one ring-shaped ID space, as shown in FIG. 2. The figure illustrates the terminal ID and contents ID given at 32 bits. In the figure, round marks indicate the terminal ID, and squares the contents ID, and the ID increase in a counter-clockwise direction.

In the embodiment, a rule being applied to the effect that "a terminal apparatus managing contents information which has a certain contents ID is a terminal apparatus which has terminal ID near the contents ID", a definition of "near", is that, without exceeding the contents ID, a difference between the contents ID and the terminal ID is the smallest, although in practice another definition is also acceptable, as long as it is consistent when allotting a management of the contents information to the terminal apparatus 1. In the example shown in FIG. 2, based on the definition, a contents IDa is managed by a terminal apparatus 1 having terminal ID near the contents IDa (hereafter called a "terminal IDa"), a contents IDb is managed by a terminal apparatus 1 having terminal ID near the contents IDb (hereafter called a "terminal IDb"), and a contents IDc is managed by a terminal apparatus 1 having terminal ID near the contents IDc (hereafter called "terminal IDc").

Herein, "managed" means, not that the terminal apparatus 1 is holding the contents information, but that "it knows which terminal apparatus 1 the contents information is being held in". That is, it means that the terminal apparatus 1 holds location information (herein, taken to be an IP address) of a terminal apparatus 1 (hereafter called a "contents holding terminal apparatus") holding contents information transmitted and received within the information distribution system S. For example, in FIG. 2, the terminal apparatus 1 which has the terminal IDa knows in which of the terminal apparatus 1 the contents information having the contents data IDa is being held, and the terminal apparatus 1 which has the terminal IDb, and the terminal apparatus 1 which has the terminal IDc, also know, in the same way, in which of the terminal apparatus 1 the contents information having the contents data IDb, and the contents information having the contents data IDc, respectively are being held.

In this way, the terminal apparatus 1 which knows in which of the terminal apparatus 1 certain contents information is being held is called a contents root terminal apparatus of that contents information. That is, the terminal apparatus 1 which has the terminal IDa is the contents root terminal apparatus of the contents information having the contents IDa, the terminal apparatus 1 which has the terminal IDb is the contents root terminal apparatus of the contents information having the contents IDb, and the terminal apparatus 1 which has the terminal IDc is the contents root terminal apparatus of the contents information having the contents IDc.

Also, as shown in FIGS. 1 and 2, a contents introduction apparatus 10 having a function introducing contents information into the information distribution system S, that is, a function distributing (transmitting) contents information, in order to make a terminal apparatus 1 within the information distribution system S a contents holding terminal apparatus, to the terminal apparatus 1, a function generating an information list (hereafter called a "contents catalog"), which is a list of contents information able to be transmitted and received among the terminal apparatus 1 in the information distribution system S, and providing it to the terminal apparatus 1, and the like, is provided in the information distribution system S.

1.2. Routing Table

Figure 3A:
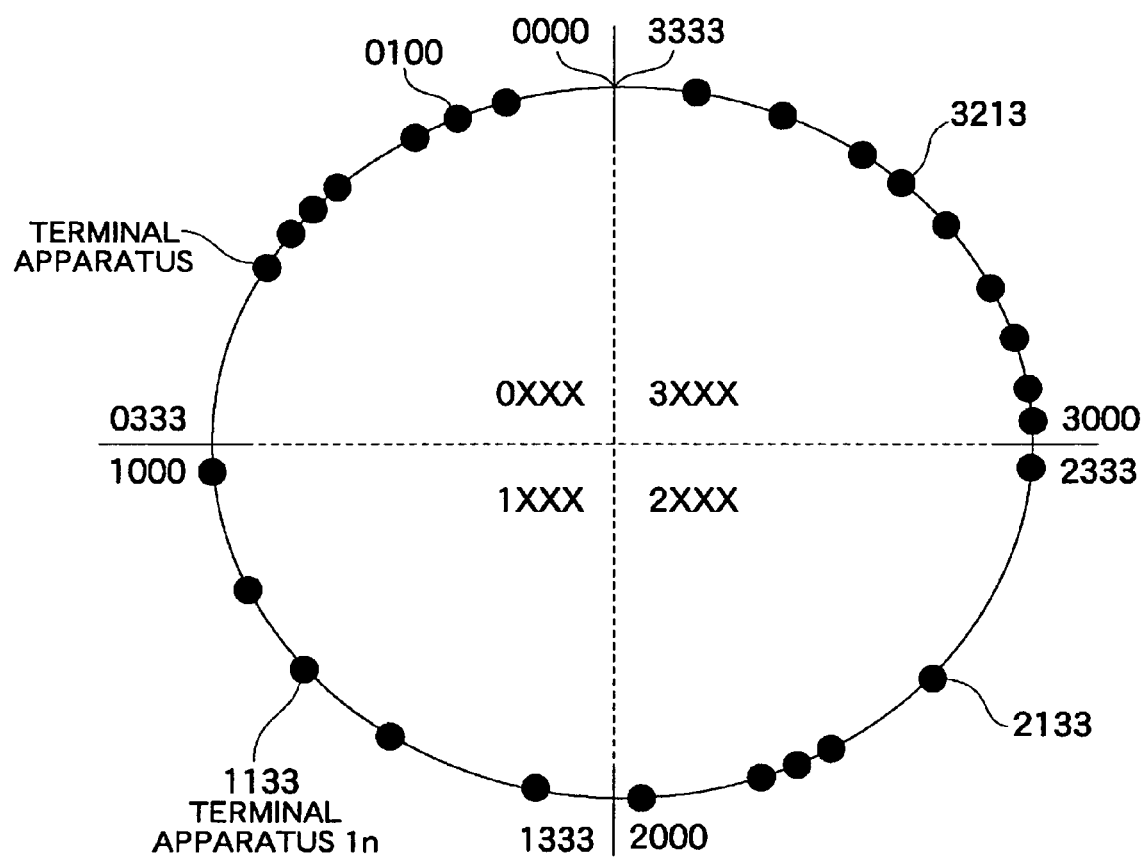
FIGS. 3A and 3B are diagrams for illustrating a routing table.
Figure 3B:
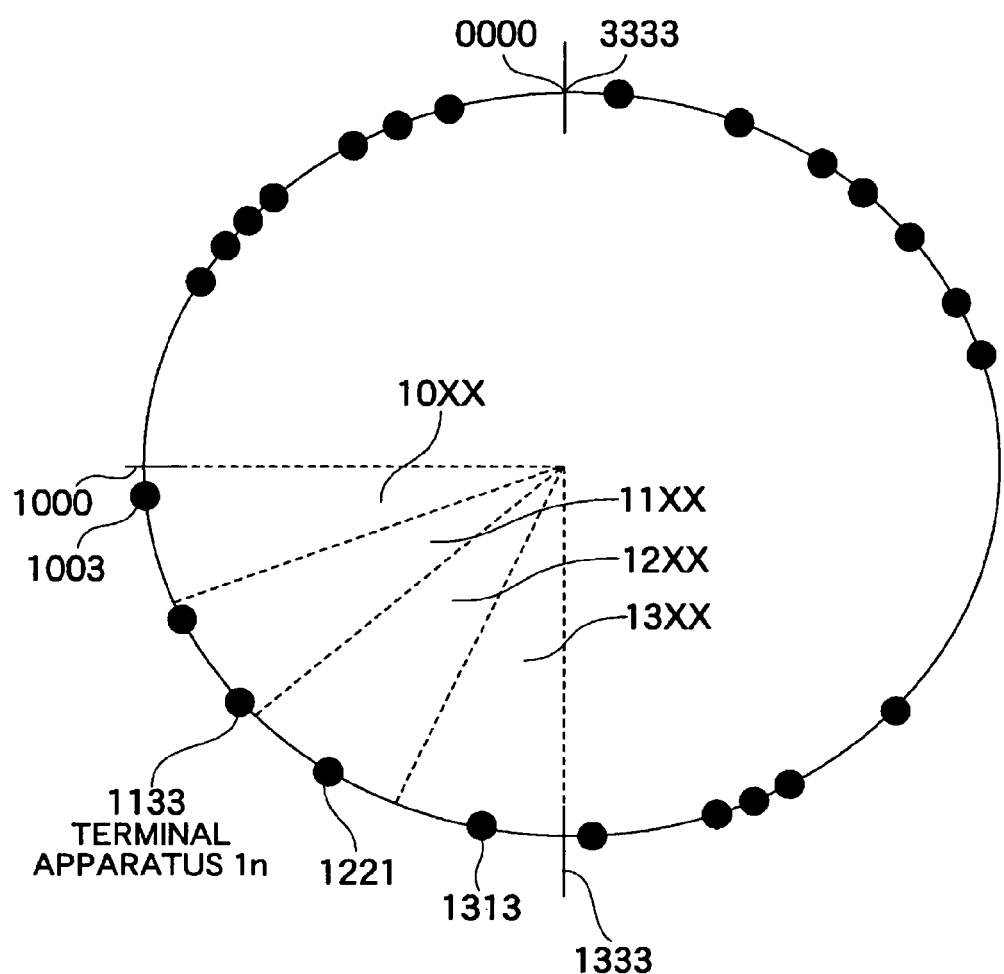

Herein, referring to FIGS. 3A, 3B and 4, a description will be given of a routing table used in the DHT. FIGS. 3A and 3B are diagrams for illustrating the routing table, while FIG. 4 is one example of the routing table. The routing table being held by each terminal apparatus 1 in order to access another terminal apparatus 1 from the terminal apparatus 1, it is formed when each terminal apparatus 1 participates in the information distribution system S, and the like.

The routing table is a table in which are correlated terminal ID, and location information of the terminal apparatus 1 corresponding to the terminal ID, which are identification information of one portion of terminal apparatus 1 among the plurality of terminal apparatus 1 configuring the information distribution system S. Specifically, the routing table, in accordance with predetermined rules, divides the terminal apparatus 1 included in the information distribution system S into a plurality of groups, takes each of these groups to be a level one group, further divides a group, among the level one groups, to which its own apparatus belongs into a plurality of groups, takes each of these groups to be a level two group, makes groups up to level n by means of the same kind of group division as the level two group division, and stores location information (an IP address) of one terminal apparatus 1 belonging to each group (except a group to which its own terminal apparatus belongs) of each step. n being a positive integer of three or more, it differs depending on an ID space of the terminal ID. For example, as shown below, in a case of an 8-bit wide quaternary number, n=4.

Herein, a description will be given of a routing table held by a terminal apparatus 1n, whose terminal ID is "1133", in a case in which the terminal ID is expressed as an 8-bit wide quaternary number ("0000" to "3333").

As shown in FIG. 3A, by dividing the ID space of the terminal ID into four, it is divided into groups of four areas, "0XXX", "1XXX", "2XXX" and "3XXX" (X is a positive integer between 0 and 3 inclusive, the same applying hereafter), whose first digits differ. These are level one groups. As the terminal ID of the terminal apparatus 1n is "1133", the terminal apparatus 1n belongs to a level one group which is the area "1XXX", in a bottom left in FIG. 3A. Consequently, as shown in FIG. 4, terminal ID and an IP address of terminal apparatus 1 existing in groups (that is, each group of the area "0XXX", the area "2XXX" and the area "3XXX") other than the level one group in which the terminal apparatus 1n exists, are stored in a level one table of the terminal apparatus 1n routing table. In this table, terminal ID and an IP address of each of "0100" as terminal ID of the area "0XXX", "2133" as terminal ID of the area "2XXX", and "3213" as terminal ID of the area "3XXX" are stored.

Next, as shown in FIG. 3B, of the level one groups, the group to which the terminal apparatus 1n belongs is further divided in four, dividing it into groups of areas "10XX", "11XX", "12XX" and "13XX". These are level two groups. In the case of the terminal apparatus 1n, as the terminal ID of the apparatus in itself is "1133", terminal ID and an IP address of terminal apparatus 1 belonging to each level two group (that is, each group of the area "10XX", the area "12XX" and the area "13XX") other than a level two group (the group of the area "11XX") to which the terminal apparatus 1n belongs, are stored in a level two table of the terminal apparatus 1n routing table, as shown in FIG. 4. In this table, terminal ID and an IP address of each of "1003" as terminal ID of the area "10XX", "1221" as terminal ID of the area "12XX", and "1313" as terminal ID of the area "13XX" are stored.

Hereafter, in the same way, of the level two groups, the group to which the terminal apparatus 1n belongs is further divided in four, dividing it into groups (level three groups) of areas "110X", "111X", "112X" and "113X", and terminal ID and an IP address of terminal apparatus 1 belonging to each level three group (that is, each group of the area "110X", the area "111X" and the area "112X") other than the level three group "113X" to which the terminal apparatus 1n belongs are stored. Also, of the level three groups, the group to which the terminal apparatus 1n belongs is further divided in four, dividing it into groups (level four groups) "1130", "1131", "1132"

and "1133", and terminal ID and an IP address of terminal apparatus 1 belonging to each level four group (that is, each group "1130", "1131" and "1132") other than the level four group "1133" to which the terminal apparatus in belongs are stored. In the event that no terminal apparatus 1 exists in the heretofore mentioned groups, terminal ID and IP address columns are empty.

In this way, in the information distribution system S, each terminal apparatus 1 has a routing table in which are correlated terminal ID, which is identification information of one portion of terminal apparatus 1 among the plurality of terminal apparatus 1 in the information distribution system S, and IP addresses, which are location information.

1.3. Contents Information Disclosure Method

Figure 5:
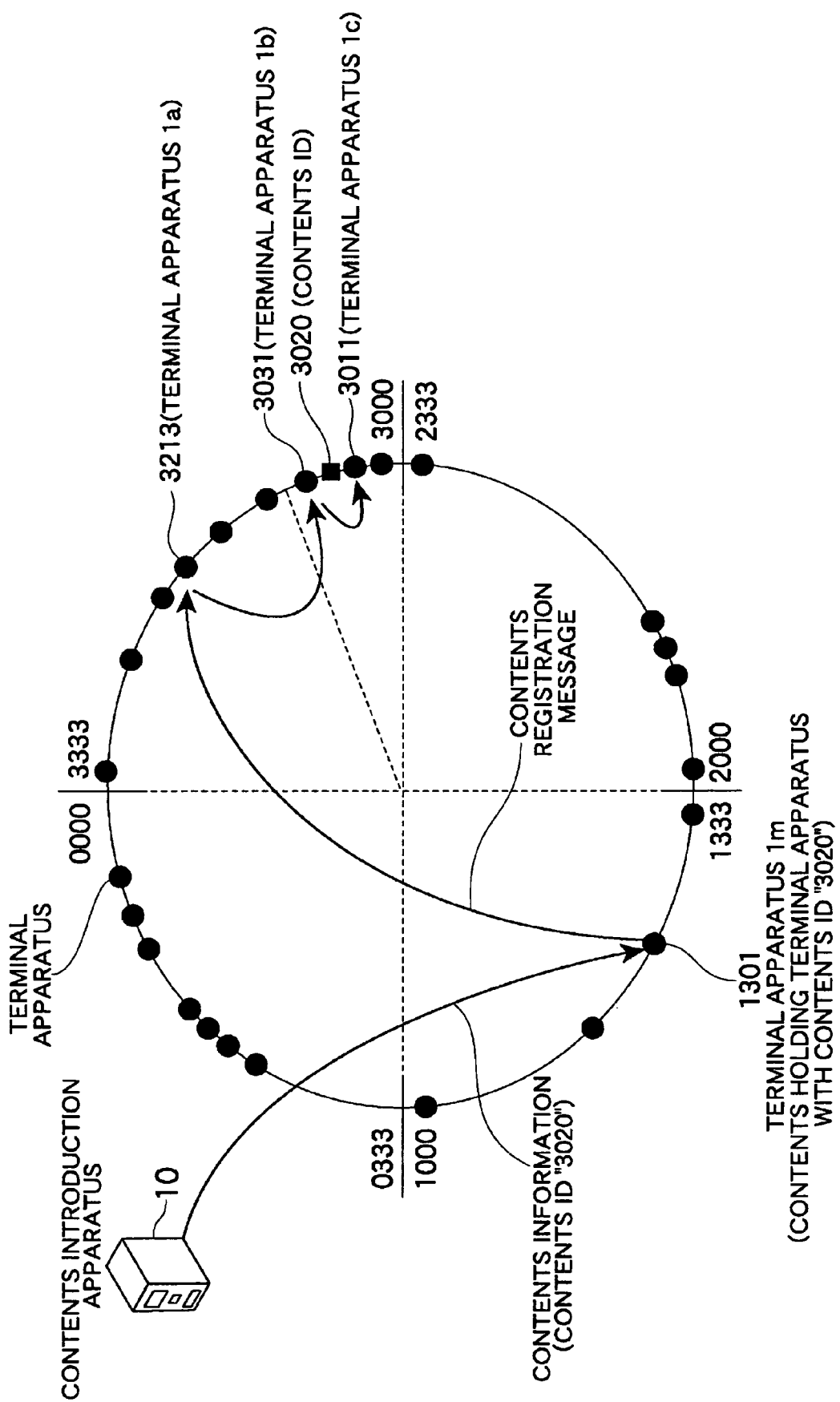
FIG. 5 is a diagram showing an aspect of a contents registration message being forwarded by DHT routing.

A description will be given, referring to the drawings, of a method when, for example, a certain terminal apparatus 1 in the information distribution system S with this kind of configuration discloses new contents information in such a way that it can be searched for by another terminal apparatus 1 in the information distribution system S. FIG. 5 shows an aspect of a contents registration message being forwarded by DHT routing.

Firstly, when the contents introduction apparatus 10 attempts to introduce (distribute) new contents information into the information distribution system S, a terminal apparatus 1 to which the new contents information is to be introduced is determined at random.

A terminal apparatus 1 which stores the contents information introduced by the contents introduction apparatus 10 in an internal memory (a contents information memory), and becomes a contents holding terminal apparatus, referring to the routing table, transmits a message (hereafter called a "contents registration message") requesting a registration of an IP address or the like, which is location information of the apparatus itself (as the contents holding terminal apparatus holding the contents information), toward a terminal apparatus 1 which has the same terminal ID as the contents ID of the contents information stored in the memory (it is not known at this point whether or not this terminal apparatus 1 actually exists).

Specifically, as shown in FIG. 5, for example, when a terminal apparatus 1*m* becomes a contents holding terminal apparatus of the contents ID "3020", the terminal apparatus 1*m* generates a contents registration message with the contents ID "3020" as destination identification information, and transmits the contents registration message referring to a routing table which it holds itself. Assuming that the terminal apparatus 1*m* is holding the same kind of routing table as the level one table of the routing table shown in FIG. 4, as the contents ID "3020" is in the area "3XXX", the terminal apparatus 1*m* transmits the contents registration message to a terminal apparatus 1*a* (terminal ID "3213"), among the terminal apparatus 1 belonging to the area "3XXX", whose IP address is known to the terminal apparatus 1*m* (that is, whose IP address is stored in the routing table which it holds itself) The contents registration message includes the contents ID of the contents information which the terminal apparatus 1*m* holds as the contents holding terminal apparatus, and the contents ID is used as the destination identification information in the contents registration message. This process is carried out by a controller 101, to be described hereafter. In this way, the controller 101 of the terminal apparatus 1, with the contents ID, which is identification information allotted to the contents information stored in the memory, as the destination identification information, functions as a contents registration message transmission section which, based on the routing table, transmits the contents registration message including the location information of its own apparatus.

Next, the terminal apparatus 1*a* which receives the contents registration message stores the contents ID, and terminal ID, IP address and the like of the contents holding terminal apparatus (hereafter called "contents index information"), included in the contents registration message in a contents location information memory. Furthermore, the terminal apparatus 1*a* determines whether or not the contents registration message is a message directed to the terminal apparatus 1*a* itself. The determination of whether or not it is a message directed to the terminal apparatus 1*a* itself is carried out based on the destination identification information and the routing table. Specifically, it is determined whether or not the destination identification information is near a terminal ID which is identification information of the terminal apparatus 1*a* itself. That is, the terminal apparatus 1*a* determines, from the terminal ID of the terminal apparatus 1 stored in the routing table (values of the table are not shown) which the terminal apparatus 1*a* itself is holding, whether the terminal apparatus 1 terminal ID nearest to the destination identification information is its own, or that of another terminal apparatus 1.

Then, as the terminal ID of another terminal apparatus 1 is nearer the destination identification information than the terminal ID of the terminal apparatus 1*a* itself, the terminal apparatus 1*a* refers to the level two table of the routing table which the terminal apparatus 1*a* itself is holding, and forwards the contents registration message to, among terminal apparatus 1 belonging to the area "30XX", a terminal apparatus 1*b* (terminal ID "3031") whose IP address is known to the terminal apparatus 1*a*.

In this way, the storing of the information included in the contents registration message and the forwarding of the contents registration message proceed by a procedure of matching digits of the contents ID in order from a first digit, and when eventually arriving at a terminal apparatus 1*c* which has a terminal ID near the destination identification information of the contents registration message, the terminal apparatus 1*c* itself determines that it should become a contents root terminal apparatus of that contents information, and stores the contents index information included in the contents registration message in a contents location information memory. Then, as will be described hereafter, on receiving a contents search message from another terminal apparatus 1, the terminal apparatus 1*c* selects, from among the stored contents index information, the IP address which is the location information of the contents holding terminal apparatus, and notifies the terminal apparatus 1 which has transmitted the contents search message. The forwarding of the message using the routing table in the heretofore described way is called a DHT routing.

Meanwhile, a holding of the contents index information in the contents root terminal apparatus is carried out by the kind of contents index table shown in FIG. 6. FIG. 6 shows an example of a contents index table in the contents root terminal apparatus 1*c*, and it stores the terminal ID, IP addresses and the like of the contents holding terminal apparatus holding the contents information with the contents ID "3020", which its own terminal apparatus manages.

Figure 7:
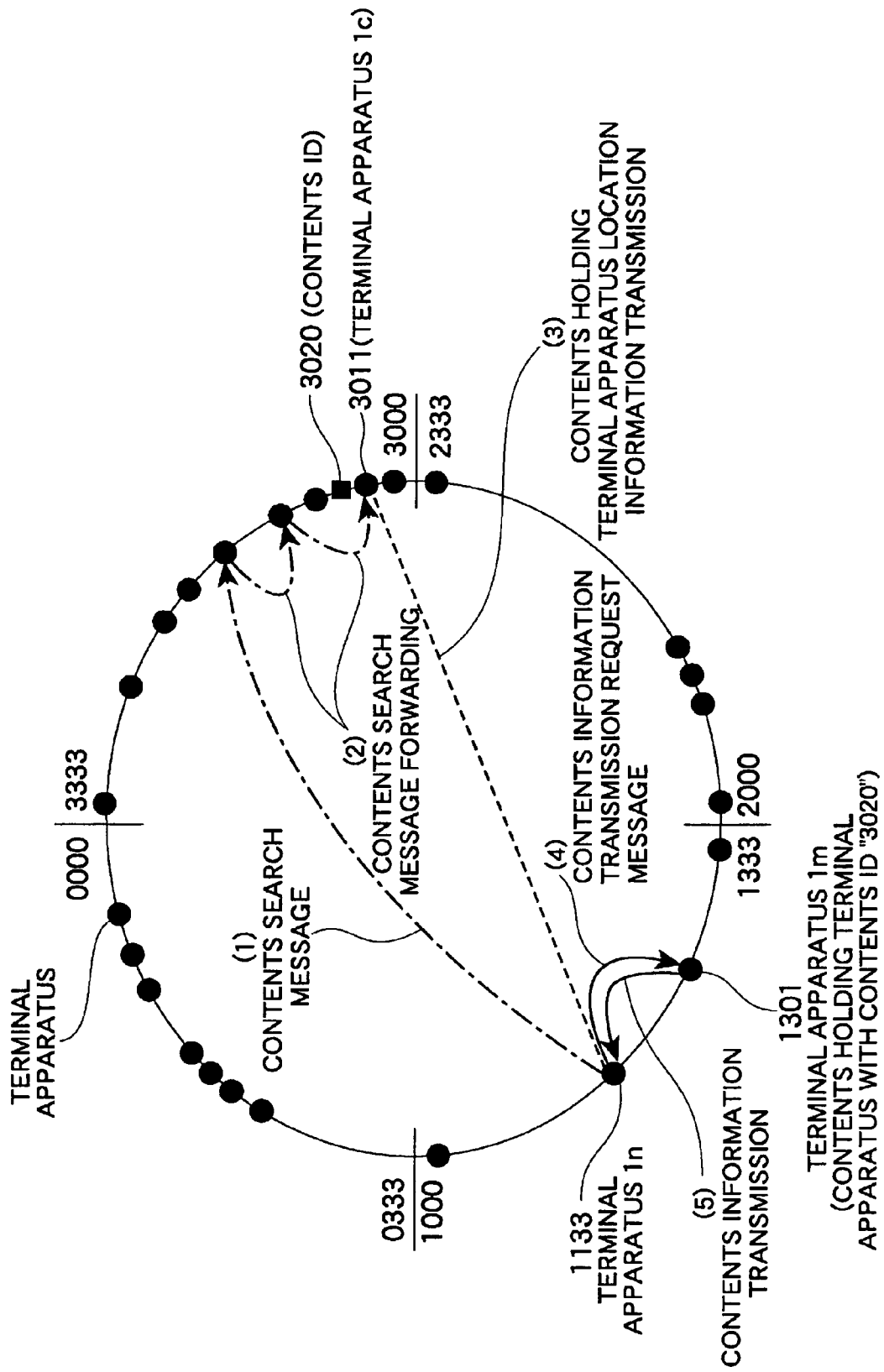

1.4. Contents Information Acquisition Method,

Next, referring to FIG. 7, a description will be given of one example of a method of searching for a terminal apparatus 1 which holds the contents information. FIG. 7 shows one example of an aspect of a terminal apparatus 1 which holds the contents information being searched for by DHT.

Herein, a description will be given of a procedure when the terminal apparatus 1*n* whose terminal ID is "1133", acting as a contents request terminal apparatus, searches for the contents information having the contents ID "3020".

As shown in FIG. 7, the contents request terminal apparatus in, referring to the routing table of the apparatus itself, with the terminal ID of a terminal apparatus 1 having the terminal ID of the same area "3XXX" as the contents ID "3020" as a destination, and the contents ID "3020" as destination identification information, transmits a message (hereafter called a "contents search message") requesting a transmission of contents holding terminal apparatus information (information including an IP address which is location information of a contents holding terminal apparatus) (refer to (1) shown in FIG. 7). This process is carried out by the controller 101, to be described hereafter. In this way, the controller 101 of the terminal apparatus 1, with the identification information allotted to the contents information stored by the contents holding terminal apparatus which is another terminal apparatus 1, as the destination identification information, has a function as a contents search message transmission section which, based on the routing table, transmits the contents search message searching for the contents holding terminal apparatus.

Then, the contents search message too, in the same way as the heretofore described contents registration message, is continuously forwarded in accordance with the routing table (refer to (2) shown in FIG. 7) and, when eventually arriving at the terminal apparatus 1c (terminal ID "3011"), which is the contents root terminal apparatus managing the contents information with the contents ID "3020", the contents root terminal apparatus 1c searches among the contents index information stored in the contents index table which is managed by itself for the contents ID "3020" included in the contents search message, and returns an IP address, and the like, of a contents holding terminal apparatus (herein, taken to be the terminal apparatus 1m) possessing the contents information with the contents ID "3020" to the contents request terminal apparatus in (refer to (3) shown in FIG. 7).

The contents request terminal apparatus in, knowing the location information of the contents information with the contents ID "3020", that is, the IP address of the contents holding terminal apparatus 1m holding the contents information with the contents ID "3020", by receiving it from the contents root terminal apparatus 1c, acquires the contents information from the contents holding terminal apparatus 1m (refer to (5) in FIG. 7) by transmitting a request for a transmission of the contents information (hereafter called a "contents information transmission request message") to the contents holding terminal apparatus 1m with the contents ID "3020" (refer to (4) shown in FIG. 7). This process is carried out by the controller 101, to be described hereafter. In this way, the controller 101 of the terminal apparatus 1 has a function as a contents acquisition section which acquires the contents information from the terminal apparatus 1 searched for by the contents search message.

As location information of contents holding terminal apparatus other than the contents root terminal apparatus is stored in the forwarding process of the contents registration message, in the process of the contents search message being forwarded, when a terminal apparatus 1 which receives the contents search message has the location information of the terminal apparatus holding the contents information having the contents ID indicated in the contents search message, the location information of the contents holding terminal apparatus is notified of from this terminal apparatus 1.

1.5. Operating History (Log) Management Method

Figure 8:
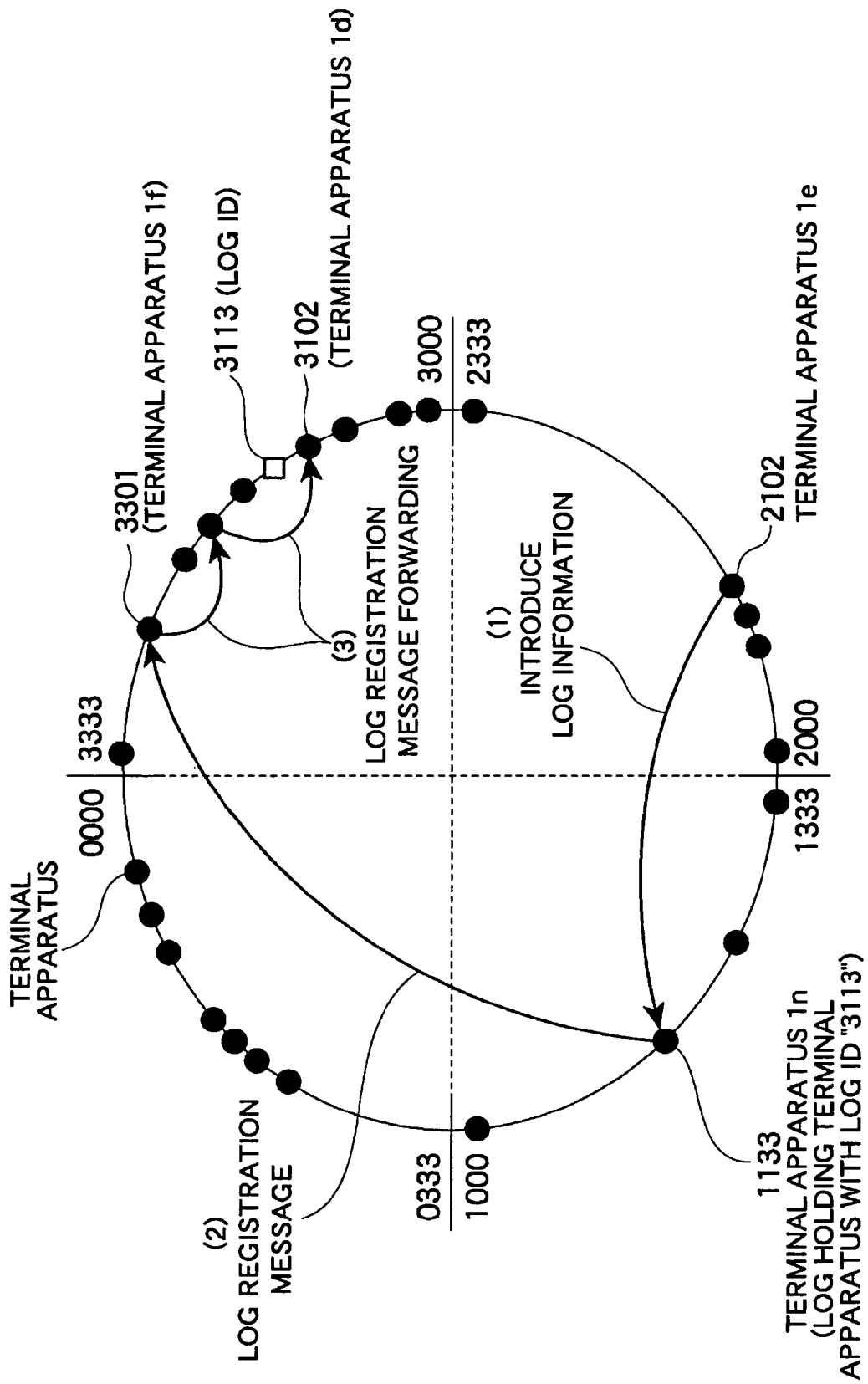
FIG. 8 is a diagram showing an example of an aspect of a log registration message being forwarded by DHT routing.

In the embodiment, each terminal apparatus 1 transmits information on an operating history of the apparatus itself at a predetermined timing, causing it to be managed by another terminal apparatus, and hereafter, a specific description will be given of that operation, referring to the drawings. FIG. 8 shows an aspect when information on an operating history of a certain terminal apparatus is transmitted to another terminal apparatus.

Each terminal apparatus 1, as an operating history of the apparatus itself, as well as a processing history of contents information such as a downloading time and date (an acquisition time and date), a reproduction time and date and an uploading time and date (a transmission time and date) of the contents information, stores a history of an error in communication with another terminal apparatus 1, a downloading processing time and an uploading processing time of the contents information, and the like, a history of an operational error, a load condition and the like inside the terminal apparatus 1, and the like, in a log storage section of the apparatus itself. Hereafter, an operating history stored in the log storage section of the apparatus itself in this way will be called log information.

Then, each terminal apparatus 1 transmits the log information stored in the log storage section of the apparatus itself, at a predetermined timing, to another terminal apparatus. For example, it transmits log information of a predetermined period (for example, one day) at a predetermined interval (for example, one day) to another terminal apparatus 1, causing the other terminal apparatus 1 to manage the log information of each predetermined period.

Herein, a configuration is such that the other terminal apparatus 1 which is the transmission destination of the log information can be selected, by means of a setting, by either of the following methods.

(1) Another terminal apparatus whose location information is stored in the routing table.

(2) Another terminal apparatus having a randomly determined terminal ID.

When the heretofore described (1) is selected, the terminal apparatus 1 selects one, or two or more, terminal apparatus 1 from the routing table of the apparatus itself. For example, in the case of having the routing table shown in FIG. 4, the terminal apparatus 1 selects the terminal apparatus with the level one terminal ID "0100", "2133" and "3213" as the other terminal apparatus 1 to which to transmit the log information. The terminal apparatus 1 changes the other terminal apparatus 1 to be selected at a predetermined interval. For example, after selecting the terminal apparatus with the level one terminal ID, it makes the other terminal apparatus 1 to be selected next the terminal apparatus 1 having the level two terminal ID.

Also, it is also possible to arrange in such a way as to, rather than select the other terminal apparatus 1 in accordance with a predetermined rule (changing at a predetermined interval), as heretofore described, randomly select one, or two or more, other terminal apparatus 1 from the routing table.

When the heretofore described (2) is selected, the terminal apparatus 1, without using the routing table, selects the other terminal apparatus 1 to which to transmit the log information by randomly determining one, or two or more, terminal ID. For example, the terminal apparatus 1 selects the terminal apparatus with the terminal ID "0231", "2310" and "3001" as the other terminal apparatus 1.

Each terminal apparatus 1, on selecting the other terminal apparatus 1 to which to transmit the log information in the heretofore described ways, introduces (distributes) the log information of the predetermined period in the apparatus itself to the selected other terminal apparatus 1. At this time, when there is a terminal ID identical to that of the selected other terminal apparatus 1 in the routing table, the terminal apparatus 1, referring to the routing table, introduces the log information directly to the selected other terminal apparatus 1. On the other hand, when there is no terminal ID identical to that of the selected other terminal apparatus 1 in the routing table, the terminal apparatus 1, referring to the routing table, selects a suitable terminal apparatus 1, and transmits the log information thereto. The log information, being forwarded by DHT routing, is ultimately transmitted to the selected other terminal apparatus 1. When the selected other terminal apparatus 1 does not exist in the information distribution system S, the log information is introduced to a terminal apparatus 1 nearest to the terminal ID of the terminal apparatus 1.

Also, it is also acceptable to arrange in such a way as to, rather than randomly selecting the other terminal apparatus 1 to which to transmit the log information, in the way heretofore described, randomly select another terminal apparatus 1 to cause to request the log information. At this time, in the same way as heretofore described, the terminal apparatus 1, without using the routing table, selects the other terminal apparatus 1 to which to transmit the log information by randomly determining one, or two or more, terminal ID. Then, the terminal apparatus 1, referring to the routing table, notifies the selected other terminal apparatus 1 that it is ready to introduce the log information of the predetermined period in the apparatus itself. The other terminal apparatus 1 which receives the notification, directly or by means of a forwarding by DHT routing, requests a transmission of the log information from the terminal apparatus 1 which has transmitted the notification, and acquires the log information.

FIG. 8 shows an aspect when a terminal apparatus 1e selects the terminal apparatus in as the other terminal apparatus 1 to which to transmit the log information of the apparatus itself, and transmits the log information to the terminal apparatus in (refer to (1) shown in FIG. 8). At this time, in addition to the log information, the terminal ID of the terminal apparatus 1e, and information on a time and date of the log information, and the like, are transmitted from the terminal apparatus 1e to the terminal apparatus 1n.

The terminal apparatus 1n, on receiving the log information from the terminal apparatus 1e, allots identification information (hereafter, a "log ID") to the log information. The log ID, being identification information unique to each item of log information, is made the same length (for example, 32 bits or the like) as the terminal ID and contents ID and, for example, information (for example, "210220070620") in which a date of the log information (for example, in a case of log information of Jun. 20, 2007, "20070620") is aligned with the terminal ID (for example, "2102") of the terminal apparatus 1 which has generated the log information, is hashed with the common hash function used when the terminal ID and contents ID are acquired, and is disposed in the same ID space as the terminal ID and contents ID.

After allotting the log ID in this way, the terminal apparatus in stores the log information of the terminal apparatus 1e, correlated with the log ID, in an information storage section, to be described hereafter, inside the apparatus itself, and becomes a log holding terminal apparatus of the log ID "3113". The terminal apparatus in which has become the log holding terminal apparatus in this way, in the same way as with the transmission of the contents registration message, referring to the routing table, transmits a message (hereafter called a "log registration message") requesting a registration of the log ID, an IP address, which is location information of the terminal apparatus itself (as the log holding terminal apparatus holding the log information), or the like, toward a terminal apparatus 1 which has the same terminal ID as the log ID "3113" of the log information stored in the information storage section (it is not known at this point whether or not this terminal apparatus 1 actually exists) (refer to (2) shown in FIG. 8).

Then, the log registration message too, in the same way as the heretofore described contents registration message, is continuously forwarded in accordance with the routing table (refer to (3) shown in FIG. 8) and, in the forwarding process, the log ID included in the log registration message and the terminal ID, IP address and the like of the log holding terminal apparatus (hereafter, these are called "log index information") are stored in the terminal apparatus 1 to which the log registration message is in the process of being forwarded. Then, when the log information eventually arrives at a terminal apparatus 1d which has a terminal ID near the destination identification information of the log registration message, the terminal apparatus 1d itself determines that it should become a log root terminal apparatus of that log information, and stores the log index information included in the log registration message.

A holding of the log index information in the log root terminal apparatus is carried out by the kind of log index table shown in FIG. 10. FIG. 10 shows an example of a log index table in the log root terminal apparatus 1d, and it stores the terminal ID, IP addresses and the like of the log holding terminal apparatus holding the log information with the log ID "3113", which is managed by its own terminal apparatus.

The log information of each terminal apparatus 1 being introduced to, and held by, other terminal apparatus 1 in the information distribution system S at the predetermined interval in this way, as it is possible, in particular, to dispose identical log information dispersed among a plurality of terminal apparatus 1, even at a time when the terminal apparatus 1 which has generated the log information, or the terminal apparatus which has come to be holding the log information, becomes defective or withdraws from the information distribution system, it is possible to manage the log information in the information distribution system S.

Figure 9:
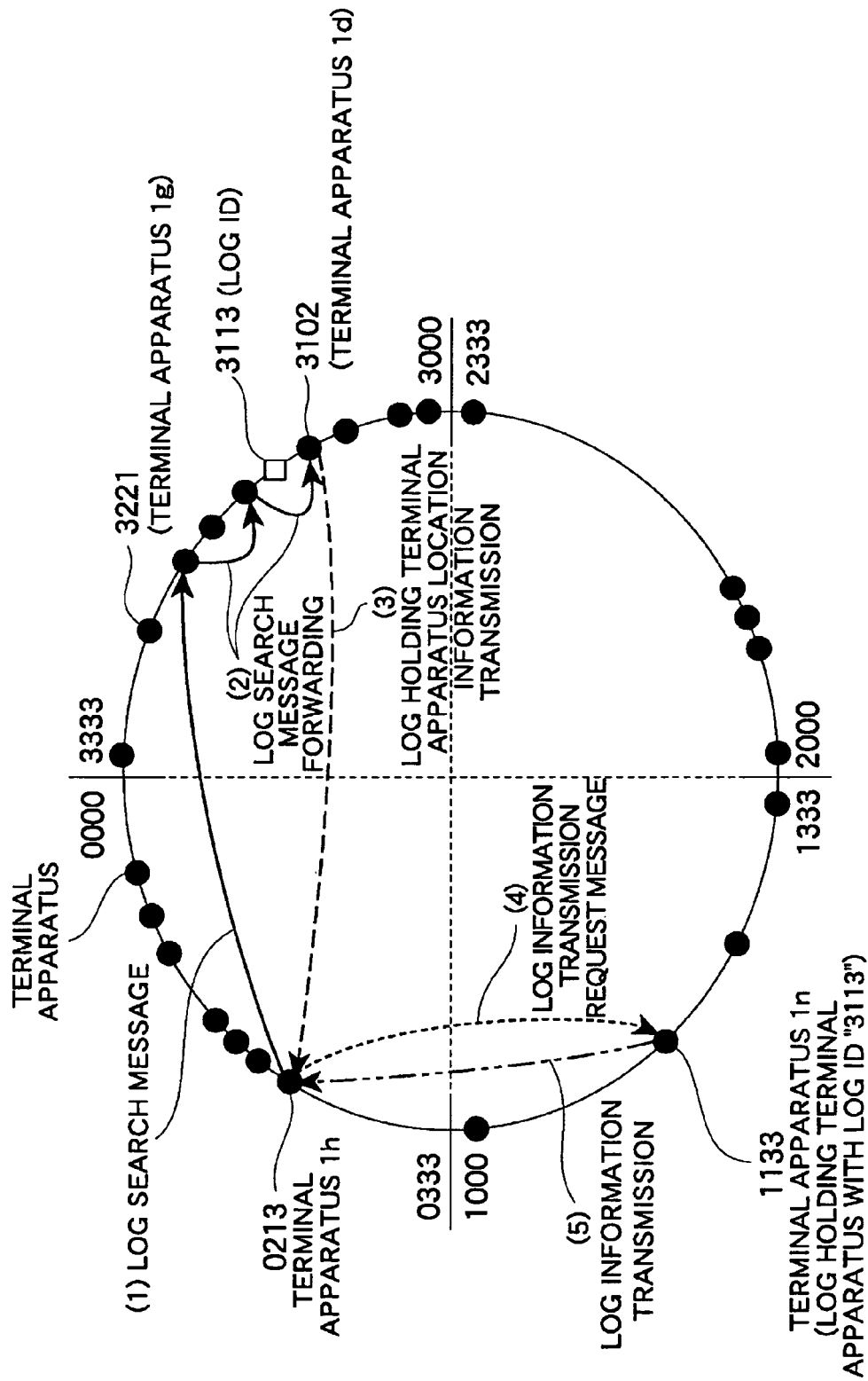

Also, a configuration is such that the log information can be removed from the terminal apparatus 1 participating in the information distribution system S. Herein, for example, taking a terminal apparatus of a manager of the information distribution system S to be a terminal apparatus 1h with terminal ID "0213", a description will be given, while referring to FIG. 9, exemplifying with an action of the manager acquiring the log information of the terminal apparatus 1e (refer to FIG. 8). FIG. 9 is a diagram showing an example of an aspect of a terminal apparatus holding the log information being searched for.

Firstly, the terminal apparatus 1h generates and transmits a message (hereafter, to be a "log search message") for acquiring location information of a log holding terminal apparatus holding the log information of the terminal apparatus 1e (refer to (1) shown in FIG. 9). The log search message making the log ID of the log information to be searched for destination identification information, it is forwarded by DHT routing in the same way as the contents search message.

Herein, the log ID of the log information to be searched for by the log search message is acquired by, for example, when the log information to be searched for is the Jun. 20, 2007 log information of the terminal apparatus 1e, information "210220070620" in which the date of the log information "1200706201" is aligned with the terminal ID "2102" of the terminal apparatus 1e being hashed with the common hash function used when the heretofore described terminal ID and contents ID are acquired.

The log search message too, in the same way as the heretofore described contents registration message, is continuously forwarded in accordance with the routing table (refer to (2) shown in FIG. 9) and, when eventually arriving at the terminal apparatus 1d (terminal ID "3102"), which is a log management terminal apparatus managing the log information with the log ID "3113", the log root terminal apparatus 1d searches among the log index information stored in the log index table which is managed by itself for the log ID "3113" included in the log search message, and returns an IP address, and the like, of a log holding terminal apparatus (herein, taken to be the terminal apparatus in) possessing the log information with the log ID "3113" to the log request terminal apparatus 1h (refer to (3) shown in FIG. 9).

The log request terminal apparatus 1h, knowing the location information of the log information with the log ID "3113", that is, the IP address of the log holding terminal apparatus in holding the log information with the log ID "3113", by receiving it from the log root terminal apparatus 1d, acquires the log information from the log holding terminal apparatus 1n (refer to (5) in FIG. 9) by transmitting a request for a transmission of the log information (hereafter called a "log information transmission request message") to the log holding terminal apparatus in with the log ID "3113" (refer to (4) shown in FIG. 9).

As location information of log holding terminal apparatus other than the log root terminal apparatus is stored in the forwarding process of the log registration message, in the process of the log search message being forwarded, when a terminal apparatus 1 which receives the log search message has the location information of the log holding terminal apparatus holding the log information having the log ID indicated in the log search message, the location information of the log holding terminal apparatus is notified of from this terminal apparatus 1.

In this way, with the information distribution system S in the embodiment, by means of a DHT routing using a routing table, it is possible to easily remove log information caused to be held by a terminal apparatus 1 differing from a terminal apparatus 1 which generates the log information. In particular, as log information is generated at a predetermined interval, and stored in the terminal apparatus 1, it becomes easier to acquire log information of a necessary period. Also, as the log information is stored at every interval dispersed among a plurality of terminal apparatus 1, it is possible to suppress traffic congestion on the network more than in a case of acquiring the log information from a single terminal apparatus 1.

Although, in the above description, it is arranged in such a way that a log ID is allotted to the log information in a log holding terminal apparatus (for example, the terminal apparatus in in FIG. 8), it is also possible to allot a log ID to the log information in a terminal apparatus which introduces the log information (for example, the terminal apparatus 1e in FIG. 8). In this case, the terminal apparatus which introduces the log information transmits the log ID, in addition to the log information, to the log holding terminal apparatus. A method of allotting the log ID is the same as that heretofore described.

Hereafter, a more specific description will be given, referring to the drawings, of a configuration and operations of the terminal apparatus 1 in the information distribution system S in the first embodiment.

1.6. Description of Configuration and Operations of Terminal Apparatus

Firstly, a description will be given of a configuration and operations of the terminal apparatus 1, referring to the drawings.

Regarding Configuration of Terminal Apparatus

Figure 11:
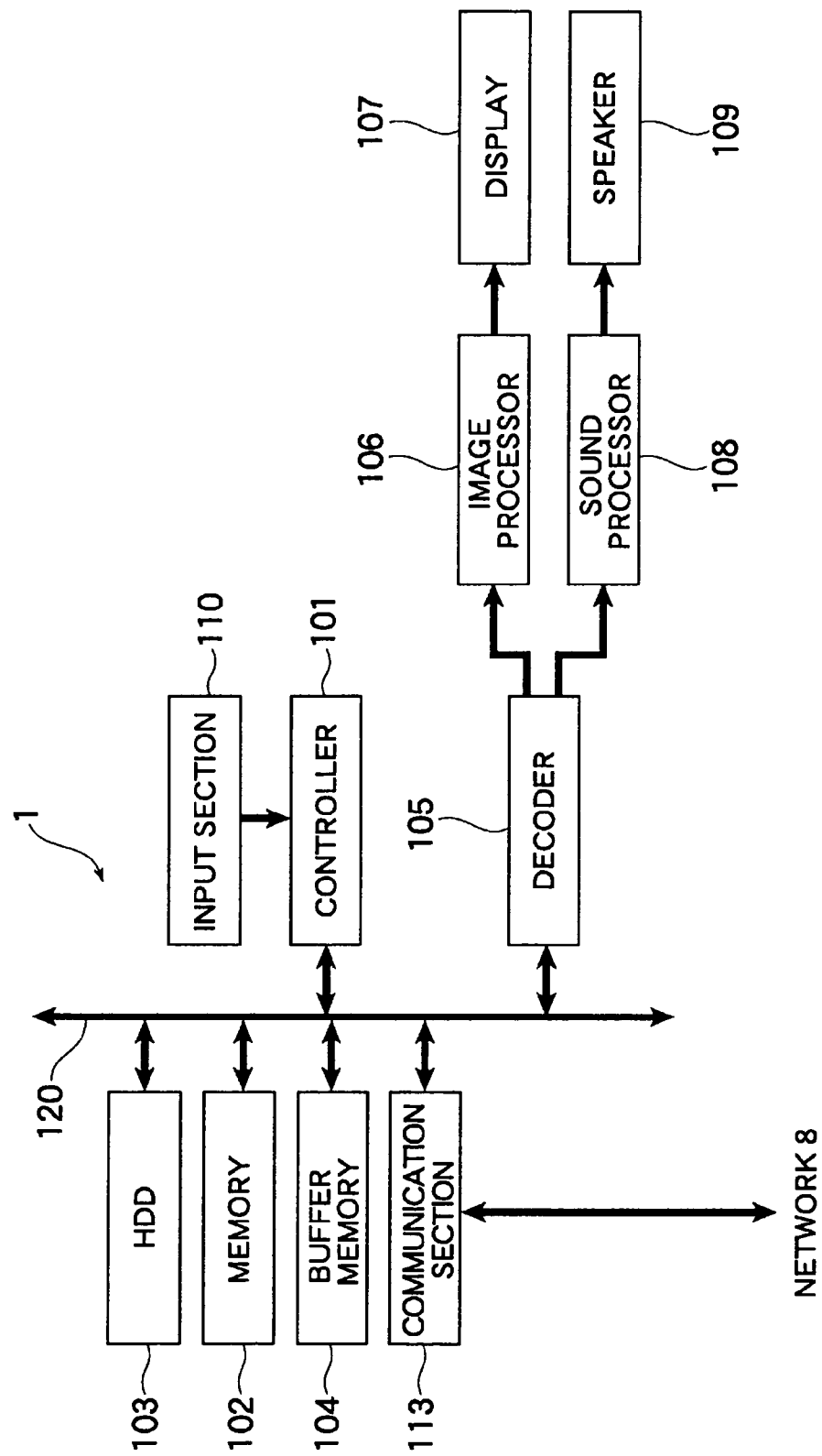
FIG. 11 is a diagram showing an outline configuration of the terminal apparatus.

Firstly, a description will be given of the configuration of the terminal apparatus 1. FIG. 11 is a diagram showing an outline configuration of the terminal apparatus 1 in the information distribution system S according to the embodiment.

The terminal apparatus 1, a general personal computer as well as a designated computer being applicable, is configured, as shown in FIG. 11, including a controller 101, a rewritable memory 102, which stores various kinds of data and parameters, a hard disc (HDD) 103, which stores various kinds of information such as contents information and log information, a buffer memory 104, which temporarily stores contents information acquired from the contents introduction apparatus 10 or another terminal apparatus 1, a decoder 105, which sequentially retrieves and decodes the contents information stored in the hard disc 103 and buffer memory 104, an image processor 106, which converts image information, among the contents information decoded by the decoder 105, into information displayable on a display 107, to be described hereafter, the display 107, such as a liquid crystal display (LCD), which displays an image based on an output from the image processor 106, a sound processor 108, which converts sound information, among the contents information decoded by the decoder 105, into information transmissible as a sound wave from a speaker 109, to be described hereafter, the speaker 109, which transmits a sound wave based on an output from the sound processor 108, an input section 110, consisting of a mouse and keyboard or the like, and a communication section 113 for communicating with the contents introduction apparatus 10 or another terminal apparatus 1, via the network 8. The controller 101, the memory 102, the hard disc 103, the buffer memory 104, the decoder 105, and the communication section 113 are mutually connected via a system bus 120.

The controller 101 is configured of a CPU (Central Processing Unit), an internal ROM (Read Only Memory), and an internal RAM (Random Access Memory). An information processing program for participating in the information distribution system S, and transmitting and receiving contents information and log information, being stored in the internal ROM, the CPU functions as the heretofore described contents registration message transmission section, contents search message transmission section, contents acquisition section, and the like, and an own apparatus information transmission section, a registration message transmission section, a search message transmission section, an information acquisition section, a determination section, a location information transmission section, an identification information generation section, a location information deletion section, and the like, to be described hereafter, by retrieving and executing the information processing program stored in the internal ROM.

It is acceptable that the information processing program is, for example, downloaded via the network 8 and communication section 113 into the internal ROM of the controller 101 from a server (for example, the contents introduction apparatus 10) connected to the network 8, or that, after being recorded on a computer readable recording medium such as a CD-ROM, it is loaded into the internal ROM of the controller 101 via an unshown recording medium drive.

Also, the memory 102 has a function as a routing table storage section, which stores a routing table, a function as a contents location information storage section, which stores a contents index table, a function as a location information storage section, which stores a log index table, and the like.

Also, the hard disc 103 has a function as a contents information storage section, which stores contents information acquired from the contents introduction apparatus 10 or another terminal apparatus 1, a function as an own apparatus log memory, which stores log information of its own apparatus, a function as an information storage section, which stores log information of another terminal apparatus 1, and the like.

Operations of Terminal Apparatus 1

A specific description will be given of operations of the terminal apparatus 1 configured in the above way. FIGS. 12 to 18 are flowcharts showing one example of operational details of the terminal apparatus 1. Each of the following processes is executed by the controller 101 of the terminal apparatus 1 functioning as the heretofore described sections and the like. Herein, a description being given focusing on operations of a transmission and reception of log information, which is a characteristic portion in the embodiment, one portion of the operational details will be omitted.

Figure 12:
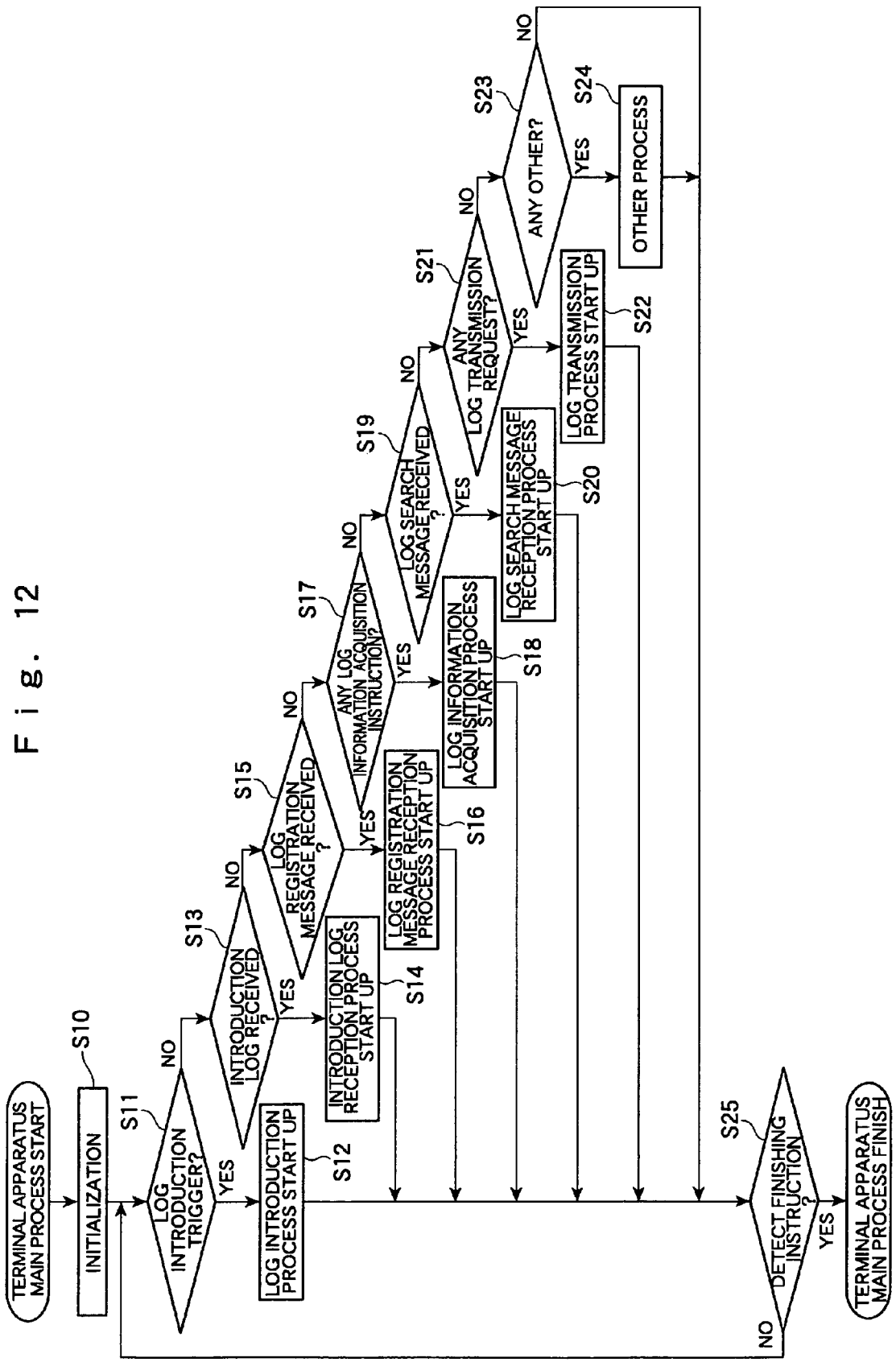
FIG. 12 is a flowchart of a main operation in the terminal apparatus according to the first embodiment.

As shown in FIG. 12, when a main power switch (not shown) on the terminal apparatus 1 is activated, or when a reset switch (not shown) is operated, the CPU of the controller 101 executes initial setting operations, such as permitting an access to the memory 102, and securing a working area of the internal RAM, retrieves the information processing program stored in the internal ROM and, after putting a function as the controller 101 in an operating condition (step S10), shifts the process to step S11, participating in the information distribution system S.

Herein, the participation in the information distribution system S is carried out in the following way by processes implemented by the controller 101. Firstly, the controller 101 acquires a terminal ID of its own apparatus by calculating an IP address of its own apparatus with a predetermined hash function. The controller 101, with the terminal ID as destination identification information, transmits a participation message, including location information (the IP address and the like) of its own apparatus, to a predetermined terminal apparatus 1, via the communication section 113. The participation message is forwarded by DHT routing. Then, another terminal apparatus 1 which receives the participation message removes, from a routing table of its own apparatus, information of a table of a level according to a number of times the participation message has been forwarded, and transmits the information to the terminal apparatus 1 which has transmitted the participation message. The controller 101, acquiring the information on the routing table in this way, via the communication section 113, from the terminal apparatus 1 which has received the participation message, generates a routing table based on the information, and participates in the information distribution system S.

Also, the controller 101 acquires a contents catalog from the contents introduction apparatus 10 at a time of participating in the information distribution system S, and displays details of the contents catalog on the display 107. By this means, it is possible for a user of the terminal apparatus 1 to ascertain contents information distributable in the information distribution system S, and acquire desired contents information by carrying out a predetermined operation.

In step S11, the controller 101 determines whether or not a log introduction trigger has come around. The controller 101, by means of an internal timer (not shown), causes a log introduction trigger to occur at a predetermined interval (for example, every one day). Also, the controller 101 also causes a log introduction trigger to occur when log information reaches a predetermined amount (for example, 1,000 items of log information). A setting, and change thereof, of the predetermined interval and predetermined amount are possible by means of an input with the input section 110.

In this process, if it is determined that a log introduction trigger has come around (step S11: Yes), the controller 101 starts up a log introduction process (step S12). The log introduction process, being a process of steps S30 to S32 in FIG. 13, will be described in detail hereafter.

Meanwhile, if it is determined that no log introduction trigger has come around (step S11: No), the controller 101 determines whether or not an introduction log has been received (step S13). That is, the controller 101 determines whether or not log information of another terminal apparatus 1 transmitted from that terminal apparatus 1 has been received via the communication section 113.

In this process, if it is determined that an introduction log has been received from another terminal apparatus 1 (step S13: Yes), the controller 101 starts up an introduction log reception process (step S14). The introduction log reception process, being a process of steps S40 to S42 in FIG. 14, will be described in detail hereafter.

Meanwhile, if it is determined that no introduction log has been received from another terminal apparatus 1 (step S13: No), the controller 101 determines whether or not a log registration message transmitted from another terminal apparatus 1 has been received via the communication section 113 (step S15).

In this process, if it is determined that a log registration message has been received (step S15: Yes), the controller 101 starts up a log registration message reception process (step S16). The log registration message reception process, being a process of steps S50 to S52 in FIG. 15, will be described in detail hereafter.

Meanwhile, if it is determined that no log registration message has been received (step S15: No), the controller 101 determines whether or not there is a log information acquisition instruction (step S17). For example, the controller 101 determines that a log information acquisition instruction has been issued when a predetermined operation has been performed on the input section 110 by the user of the terminal apparatus 1.

In this process, if it is determined that there is a log information acquisition instruction (step S17: Yes), the controller 101 starts up a log information acquisition process (step S18). The log information acquisition process, being a process of steps S60 to S65 in FIG. 16, will be described in detail hereafter.

Meanwhile, if it is determined that there is no log information acquisition instruction (step S17: No), the controller 101 determines whether or not a log search message transmitted from another terminal apparatus 1 has been received via the communication section 113 (step S19).

In this process, if it is determined that a log search message has been received (step S19: Yes), the controller 101 starts up a log search message reception process (step S20). The log search message reception process, being a process of steps S70 to S74 in FIG. 17, will be described in detail hereafter.

Meanwhile, if it is determined that no log search message has been received (step S19: No), the controller 101 determines whether or not a log transmission request transmitted from another terminal apparatus 1 has been received via the communication section 113 (step S21).

In this process, if it is determined that a log transmission request has been received (step S21: Yes), the controller 101 starts up a log transmission process (step S22). The log transmission process, being a process of steps S80 to S82 in FIG. 18, will be described in detail hereafter.

Meanwhile, if it is determined that no log transmission request has been received (step S21: No), the controller 101 determines whether or not it is necessary to carry out another process (step S23). Then, when that other process is necessary (step S23: Yes), the controller 101 carries out the other process (step S24). For example, when contents information transmitted from the contents introduction apparatus 10 have been received via the communication section 113, the controller 101, based on the routing table, transmits a contents registration message. Also, when there has been a contents information acquisition operation by the user via the input section 110, the controller 101 generates a contents search message based on a contents ID of the contents information and, based on the routing table, transmits the contents search message via the communication section 113. Also, the controller 101 determines whether or not a predetermined period (for example, one month) has elapsed since log information of another terminal apparatus 1 stored on the hard disc 103 has been stored and, in the event that it is determined that the predetermined period has elapsed, the controller 101 deletes the log information for which the predetermined period has elapsed from the hard disc 103. Also, the controller 101 determines whether or not a predetermined period (for example, one month) has elapsed since location information of a log holding terminal apparatus stored in the log index table of the memory 102 has been stored and, in the event that it is determined that the predetermined period has elapsed, the controller 101 deletes the location information for which the predetermined period has elapsed from the log index table of the memory 102. In this way, the controller 101, after storing location information of another terminal apparatus 1 in the log index table, functions as a location information deletion section which, when the predetermined period has elapsed, deletes the location information of the log holding terminal apparatus stored in the log index table.

When it is determined, in step S23, that that other process is not necessary (step S23: No), or when the processes of steps S12, S14, S16, S18, S20, S22 and S24 are finished, the controller 101 determines whether or not a finishing instruction has been detected (step S25). For example, when a power source of its own terminal apparatus shifts to a deactivated condition, the controller 101 detects a finishing instruction.

In step S25, if it is determined that a finishing instruction has been detected (step S25: Yes), the controller 101 finishes a main process, while if it is determined that no finishing instruction has been detected (step S25: No), the controller 101 repeats the process from step S11.

Figure 13:
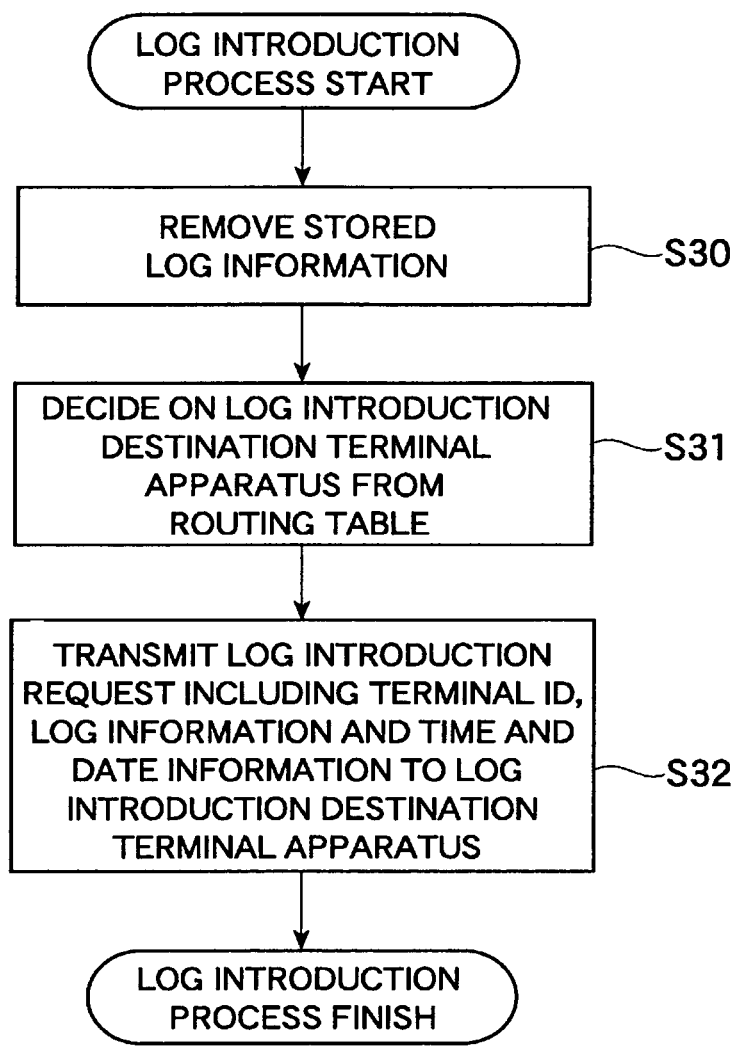
FIG. 13 is a flowchart of a log introduction process in the terminal apparatus according to the first embodiment.

Next, a specific description will be given, referring to the flowchart of FIG. 13, of the log introduction process started up in step S12. FIG. 13 is a flowchart of the log introduction process in the terminal apparatus 1.

As shown in FIG. 13, on starting the log introduction process, the controller 101 removes the log information of the predetermined period from the hard disc 103 (step S30). For example, when log information of Jun. 20, 2007 to Jun. 25, 2007 is on the hard disc 103, and the log information of Jun. 25, 2007 has not yet been transmitted, the controller 101 removes the log information of Jun. 25, 2007. The log information stored in the hard disc 103 being stored by a process of the controller 101, as heretofore described, as well as a processing history of contents information such as an acquisition time and date, reproduction time and date and transmission time and date of the contents information, the controller 101 stores a history and the like of various kinds of error information, such as an error in communication with another terminal apparatus 1 or an operational error in the terminal apparatus 1, an acquisition processing time and a transmission processing time of the contents information, a load condition inside the terminal apparatus 1, and the like, on the hard disc 103 as an own apparatus log storage section. Error details, an error time and date, and the like, being included in the error information, and time and date information, information on a communication destination terminal apparatus, and the like, being included in the processing history of the contents information, they are stored on the hard disc 103 when each condition occurs. Also, although a load rate, a load cause and the like are included in the load condition inside the terminal apparatus 1, and regularly stored on the hard disc 103, it is also acceptable to arrange in such a way that the load rate is stored on the hard disc 103 when it reaches a predetermined value.

Next, the controller 101 selects two or more log information introduction destination terminal apparatus 1 (hereafter, to be "log introduction destination terminal apparatus") from the routing table stored in the memory 102 (step S31). A method of selecting the introduction destination terminal apparatus 1 is as described in 1.5. Operating History (Log) Management Method.

The controller 101 transmits a log introduction request including the terminal ID of its own apparatus, the log information to be introduced, and time and date information (for example, Jun. 25, 2007 in the case of the log information of Jun. 25, 2007) of the log information, via the communication section 113, to the log introduction destination terminal apparatus selected in this way (step S32), and finishes the log introduction process. In this way, the controller 101 functions as an own apparatus information transmission section, which randomly selects two or more other terminal apparatus 1 whose location information is stored in the routing table, and transmits the log information of its own apparatus to the other terminal apparatus 1 selected, via the communication section 113. It is also acceptable to arrange in such a way as to cause the controller 101 to function as an own apparatus information transmission section which, without referring to the routing table, randomly selects two or more terminal ID from among the terminal ID allotted to the information distribution system S and, with the terminal ID selected as destination identification information, transmits the log information of its own apparatus based on the routing table of the memory 102.

Figure 14:
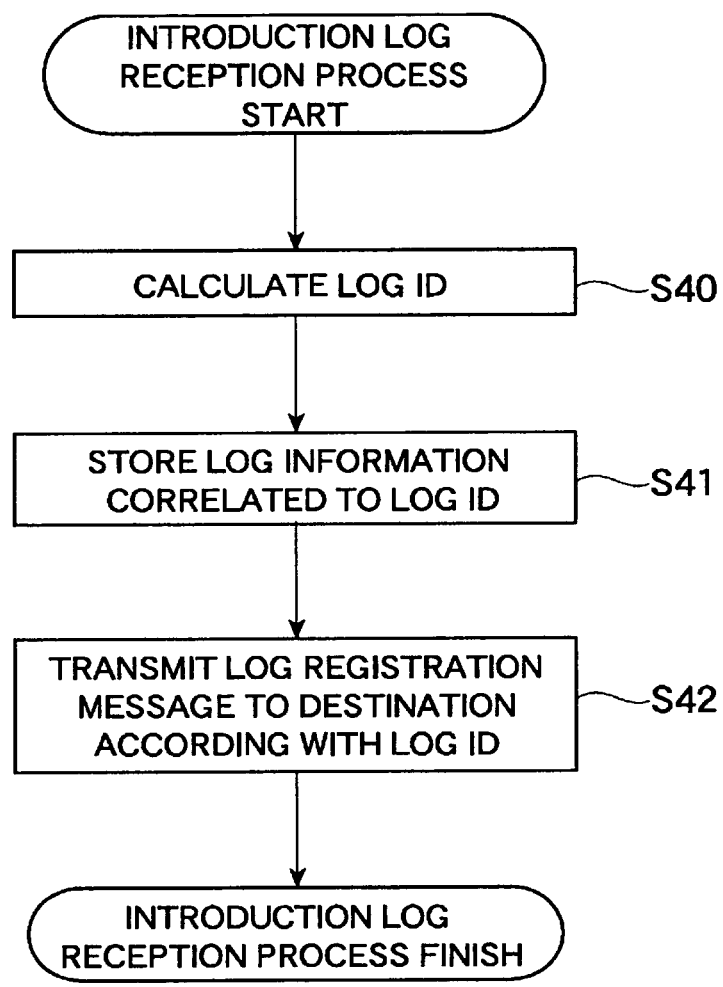
FIG. 14 is a flowchart of an introduction log reception process in the terminal apparatus according to the first embodiment.

Next, a specific description will be given, referring to the flowchart of FIG. 14, of the introduction log reception process started up in step S14. FIG. 14 is a flowchart of the introduction log reception process in the terminal apparatus 1.

As shown in FIG. 14, on starting the introduction log reception process, the controller 101 calculates a log ID from the terminal ID, and time and date information of the log information, of the other terminal apparatus 1 determined to have been received in step S13 (step S40). A method of calculating the log ID is as described in 1.5. Operating History (Log) Management Method. In this way, the controller 101 functions as an identification information generation section which, when storing the log information of the other terminal apparatus 1 on the hard disc 103, allots a log ID, which is identification information, to the log information stored on the hard disc 103, based on the terminal ID and the date of the log information, which is identification information of the other terminal apparatus 1.

Next, the controller 101 correlates the log information of the other terminal apparatus 1 determined to have been received in step S13 to the log ID calculated in step S40, and stores them on the hard disc 103, which acts as an information storage section (step S41). In this way, the controller 101 functions as an information storage control section, which stores log information of other terminal apparatus transmitted from the other terminal apparatus 1.

Subsequently, the controller 101 transmits a log registration message to a destination according with the log ID (step S42), and finishes the introduction log reception process. Specifically, with the log ID calculated in step S40 as destination identification information, the controller 101 transmits a log registration message including the terminal ID, and IP address and the like, of its own apparatus via the communication section 113. At this time, the controller 101, referring to the routing table stored in the memory 102, decides on a terminal apparatus near the destination identification information as the terminal apparatus 1 to which to transmit the log registration message, and transmits the log registration message to the terminal apparatus 1. In this way, the controller 101 functions as a registration message transmission section which, when storing the log information on the hard disc 103, which acts as the information storage section, takes the log ID, which is the identification information allotted to the log information, as the destination identification information and, based on the routing table stored in the memory 102, transmits a registration message including the IP address which is the location information of its own apparatus.

Figure 15:
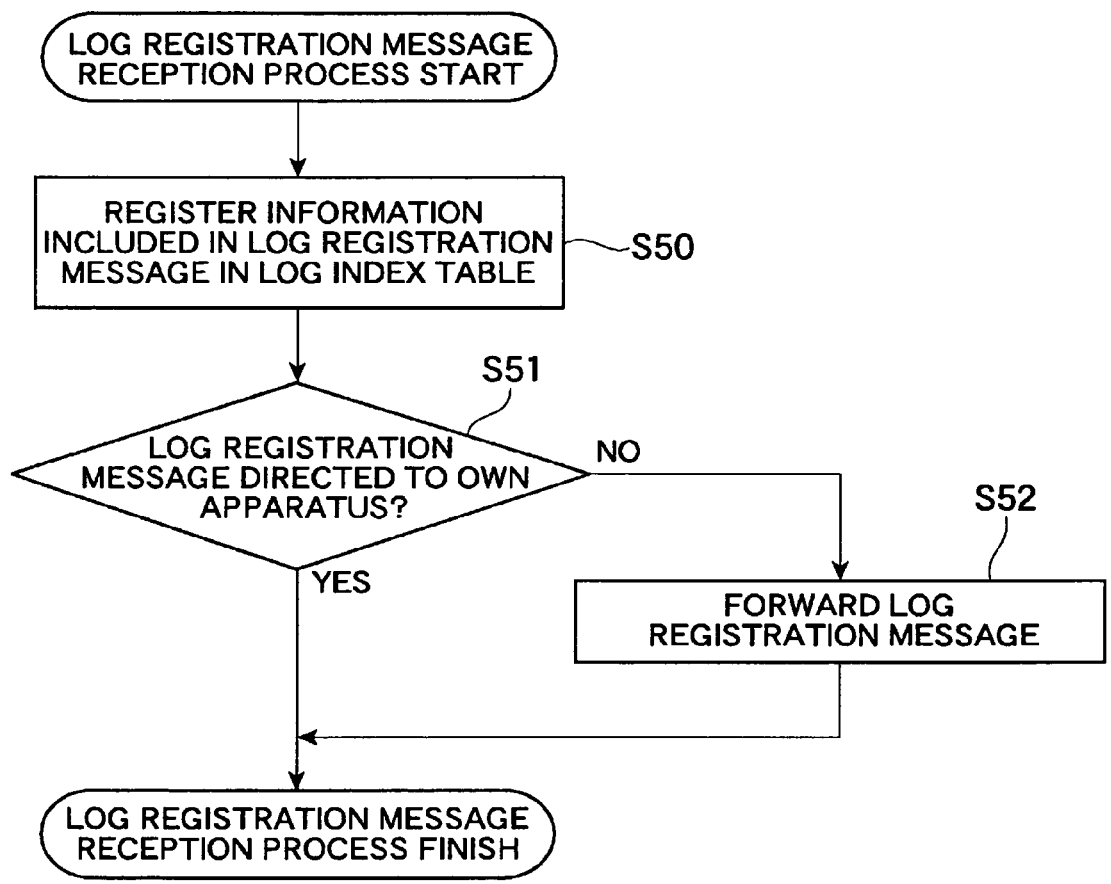
FIG. 15 is a flowchart of a log registration message process in the terminal apparatus according to the first embodiment.

Next, a specific description will be given, referring to the flowchart of FIG. 15, of the log registration message reception process started up in step S16. FIG. 15 is a flowchart of the log registration message reception process in the terminal apparatus 1.

As shown in FIG. 15, on starting the log registration message reception process, the controller 101 stores the information included in the log registration message in the log index table of the memory 102 (step S50). Herein, as the "information included in the log registration message", there is an IP address, which is location information of a log holding terminal apparatus, a terminal ID of the log holding terminal apparatus, and the like. In this way, the controller 101 functions as a location information storage control section which, when a message received via the communication section 113 is a log registration message, stores location information of another terminal apparatus included in the log registration message in the log index table, which acts as a location information storage section.

Next, the controller 101 determines whether or not the log registration message is addressed to its own apparatus (step S51). The determination of whether or not it is a message addressed to its own apparatus is carried out based on the destination identification information of the log registration message, and on the routing table. Specifically, when the destination identification information of the log registration message is near a terminal ID which is identification information of its own apparatus, it is determined that it is a message addressed to its own apparatus.

In this process, if it is determined that the log registration message is not a message addressed to its own apparatus (step S51: No), the controller 101 forwards the log registration message to another terminal apparatus 1 via the communication section 113 (step S52). That is, the controller 101 removes from the routing table location information of a terminal apparatus 1, among the terminal ID stored in the routing table stored in the memory 102, having a location ID near the destination identification information of the log registration message, and forwards the log registration message to the location information.

When the process of step S52 is finished, or when it is determined that the log registration message is a message addressed to its own apparatus (step S51: Yes), the controller 101 finishes the log registration message reception process.

Figure 16:
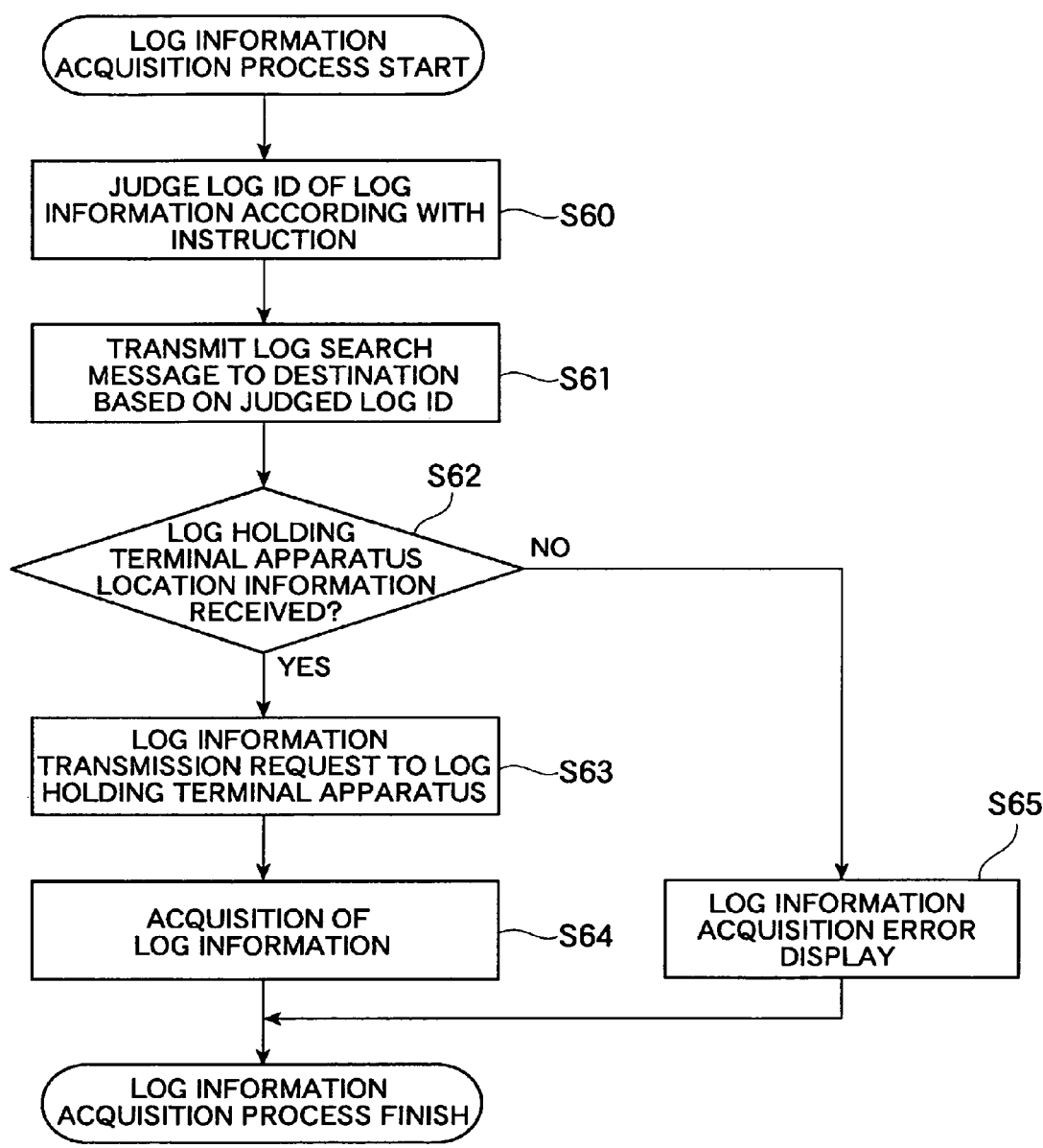
FIG. 16 is a flowchart of a log acquisition instruction process in the terminal apparatus according to the first embodiment.

Next, a specific description will be given, referring to the flowchart of FIG. 16, of the log information acquisition process started up in step S18. FIG. 16 is a flowchart of the log information acquisition process in the terminal apparatus 1.

As shown in FIG. 16, on starting the log information acquisition process, the controller 101 judges the log ID of the log information in accordance with an operational instruction from the input section 110 (step S60). The terminal ID of the terminal apparatus 1 and the time and date of the log information are included in the operational instruction from the input section 110. That is, the user of the terminal apparatus 1 inputs the terminal ID of the terminal apparatus 1 whose log information he or she wishes to acquire the log information, and the time and date of the log information, via the input section 110, and the controller 101 judges the log ID based on these items of information. For example, in a case in which an acquisition of the log information of Jun. 20, 2007 in the terminal ID "2102" has been instructed by an input via the input section 110, the log ID is calculated by hashing information in which these items of information are aligned (for example, "210220070620") with a predetermined hash function.

Next, the controller 101 transmits a log search message to a destination based on the determined log ID (step S61). Specifically, the controller 101, with the log ID calculated in step S60 as destination identification information, transmits a log search message, including the log ID and an IP address which is location information of its own apparatus, via the communication section 113. At this time, the controller 101, referring to the routing table stored in the memory 102, decides on a terminal apparatus near the destination identification information as the terminal apparatus 1 to which to transmit the log search message, and transmits the log search message to the terminal apparatus 1. In this way, the controller 101 functions as a search message transmission section which, with the log ID, which is the identification information allotted to the log information stored by another terminal apparatus 1, as the destination identification information, transmits a search message searching for a terminal apparatus holding the log information, based on the routing table stored in the memory 102.

After transmitting the log search message in this way, the controller 101 determines whether or not it has received the location information (the IP address) of the log holding terminal apparatus via the communication section 113 (step S62).

In this process, if it is determined that the location information of the log holding terminal apparatus has been received (step S62: Yes), the controller 101, based on the location information received, requests a transmission of the log information from the log holding terminal apparatus (step S63), and acquires the log information from the log holding terminal apparatus (step S64). In this way, the controller 101 functions as an information acquisition section which acquires the log information from the terminal apparatus 1 searched for with the log search message.

Meanwhile, if it is determined that the location information of the log holding terminal apparatus has not been received (step S62: No), the controller 101 carries out a display of a log information acquisition error on the display 107 (step S65). When the process of step S64 or the process of step S65 is finished, the controller 101 finishes the log information acquisition process.

Figure 17:
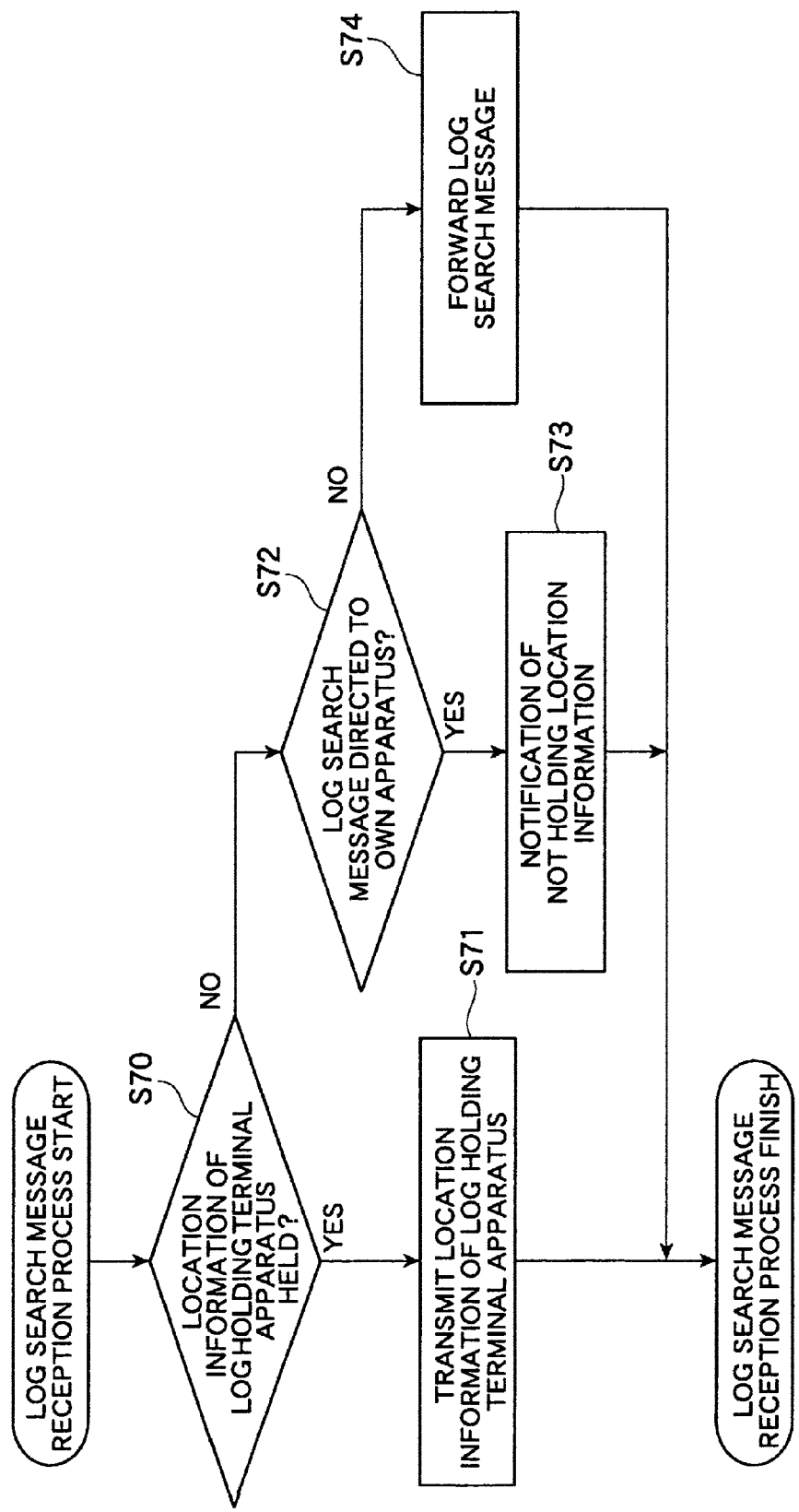
FIG. 17 is a flowchart of a log search message process in the terminal apparatus according to the first embodiment.

Next, a specific description will be given, referring to the flowchart of FIG. 17, of the log search message reception process started up in step S20. FIG. 17 is a flowchart of the log search message reception process in the terminal apparatus 1.

As shown in FIG. 17, on starting the log search message reception process, the controller 101 determines whether or not it is holding the location information of the log holding terminal apparatus which is the search object of the log search message received (step S70). That is, the controller 101 determines whether or not the location information of the log holding terminal apparatus, which is the terminal apparatus holding the log information with the log ID indicated in the log search message received, is included in the log index table of the memory 102. In this way, the controller 101 functions as a determination section which, when a message received is a log search message, determines whether or not the location information of the terminal apparatus 1 which is the search object of the log search message is stored in the log index table.

In this process, if it determines that it is holding the location information of the log holding terminal apparatus which is the search object of the log search message (step S70: Yes), the controller 101 removes, from the log index table stored in the memory 102, the location information (the IP address) of the log holding terminal apparatus holding the log information with the log ID indicated in the log search message, and transmits it to the terminal apparatus which is the transmission source of the log search message (step S71). In this way, the controller 101 functions as a location information transmission section which, when it determines that it is holding the location information of the log holding terminal apparatus which is the search object of the log search message, transmits the location information of the log holding terminal apparatus holding the log information with the log ID indicated in the log search message to the terminal apparatus which is the transmission source of the log search message.

Meanwhile, if it determines that it is not holding the location information of the log holding terminal apparatus which is the search object of the log search message (step S70: No), the controller 101 determines whether or not the log search message is addressed to its own apparatus (step S72). The determination of whether or not it is a message addressed to its own apparatus is carried out based on the destination identification information of the log search message, and on the routing table. Specifically, when the destination identification information of the log search message is near a terminal ID which is the identification information of its own apparatus, the controller 101 determines that it is a message addressed to its own apparatus.

In this process, if it determines that the log search message is not a message addressed to its own apparatus (step S72: No), the controller 101 forwards the log search message via the communication section 113 (step S74). That is, the controller 101 removes from the routing table location information of a terminal apparatus 1 having terminal ID, among the terminal ID stored in the routing table stored in the memory 102, near the destination identification information of the log search message, and forwards the log search message to the location information.

Meanwhile, if it determines that the log search message is a message addressed to its own apparatus (step S72: Yes), the controller 101 sends a notification to the terminal apparatus 1 which is the transmission source of the log search message, via the communication section 113, to the effect that it is not holding the location information of the log holding terminal apparatus (step S73). When the processes of steps S71, S73 and S74 are finished, the controller 101 finishes the log search message reception process.

Figure 18:
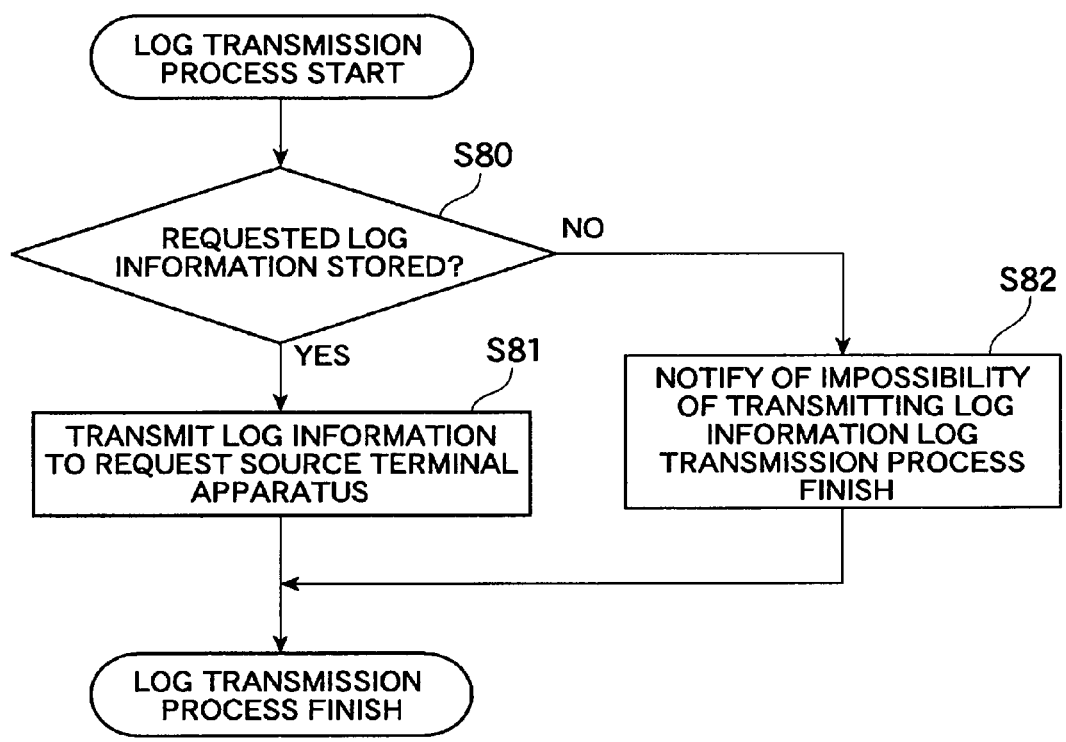
FIG. 18 is a flowchart of a log transmission process in the terminal apparatus according to the first embodiment.

Next, a specific description will be given, referring to the flowchart of FIG. 18, of the log transmission process started up in step S22. FIG. 18 is a flowchart of the log transmission process in the terminal apparatus 1.

As shown in FIG. 18, on starting the log transmission process, the controller 101 determines whether or not the requested log information is stored (step S80). That is, the controller 101 determines whether or not the requested log information is stored on the hard disc 103.

In this process, if it determines that the requested log information is stored (step S80: Yes), the controller 101 removes the requested log information from the hard disc 103, and transmits the log information, via the communication section 113, to the terminal apparatus 1 which is the request source (step S81). Meanwhile, if it determines that the requested log information is not stored (step S80: No), the controller 101 sends a notification to the effect that the log information cannot be transmitted (step S82). When the processes of steps S81 and S82 are finished, the controller 101 finishes the log transmission process.

As heretofore described, the log information of each terminal apparatus 1 being introduced to, and held by, other terminal apparatus 1 in the information distribution system S at the predetermined interval, as it is possible, in particular, to dispose identical log information dispersed among a plurality of terminal apparatus 1, even at a time when the terminal apparatus 1 which has generated the log information, or the terminal apparatus which has come to be holding the log information, becomes defective or withdraws from the information distribution system, it is possible to manage the log information in the information distribution system S. Moreover, it is possible, by means of DHT routing using the routing table, to easily remove the log information caused to be held by the terminal apparatus 1. In particular, as the log information is generated at the predetermined interval and stored in the terminal apparatus 1, it becomes easier to acquire log information of a necessary period. Also, as the log information is stored at every interval dispersed among a plurality of terminal apparatus 1, it is possible to suppress traffic congestion on the network more than in the case of acquiring the log information from a single terminal apparatus 1.

2. Second Embodiment

Next, a description will be given of operations of a terminal apparatus 1' in a second embodiment. With the terminal apparatus 1 in the first embodiment, when introducing the log information of its own apparatus, the controller 101 selects one, or two or more, terminal apparatus and introduces the log information directly but, with the terminal apparatus 1' in the second embodiment, the controller 101 selects one terminal apparatus, introduces the log information, and a terminal apparatus 1' which receives the introduction of the log information in this way stores the log information and, furthermore, forwards the log information to another terminal apparatus 1'. By this means, it is possible to reduce a process load of the terminal apparatus 1' which introduces the log information. With regard to other operations, as they are the same as the operations in the first embodiment, a description will be omitted here. The terminal apparatus 1' of the second embodiment being basically of the same configuration as the terminal apparatus 1 in the first embodiment, the details of the information processing program stored in the internal ROM of the controller 101 are partially different.

Figure 19:
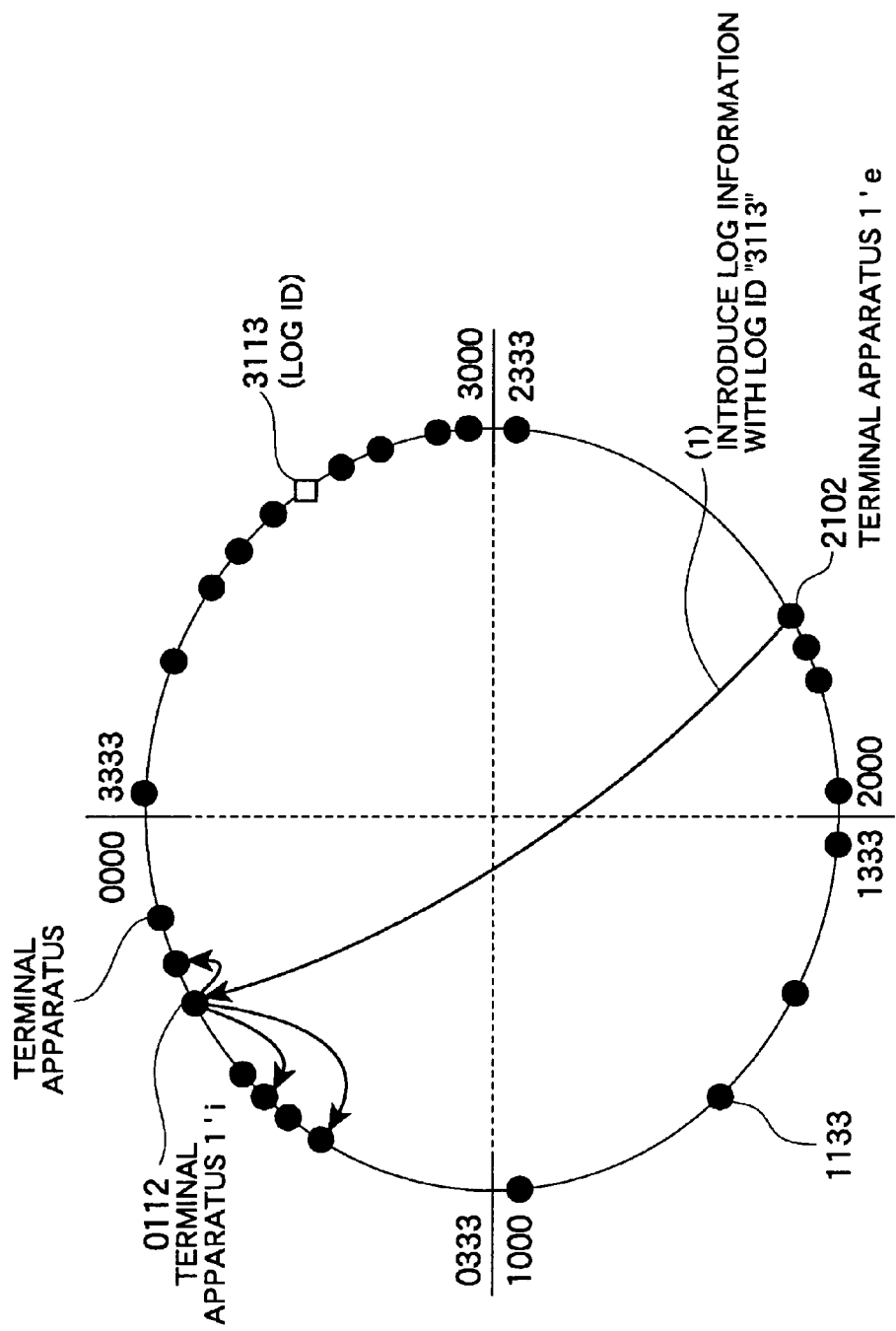
FIG. 19 is a diagram showing an example of an operation when a terminal apparatus according to a second embodiment acquires log information.

Firstly, a description will be given, referring to FIG. 19, of a log information introduction method in the terminal apparatus 1' of the second embodiment.

The terminal apparatus 1' selects one terminal apparatus 1' to which to introduce (distribute) the log information of the apparatus itself, and transmits the log information to the terminal apparatus 1'. For example, FIG. 19 shows an aspect when a terminal apparatus 1'e selects a terminal apparatus 1' i as the other terminal apparatus 1 to which to transmit the log information of the apparatus itself and, with a log ID of the log information to be introduced as "3113", forwards the log information with the log ID to the terminal apparatus 1' i (refer to (1) shown in FIG. 19). At this time, in addition to the log information, the terminal ID of the terminal apparatus 1'e, and information on a time and date of the log information, and the like (hereafter, to be "introduction log information"), are transmitted from the terminal apparatus 1' e to the terminal apparatus 1'i.

The terminal apparatus 1'i, on receiving the introduction log information from the terminal apparatus 1'e, allots a log ID to the log information in the introduction log information. Furthermore, the terminal apparatus 1'i, based on the routing table stored in the memory 102, transfers the introduction log information. At this time, the controller 101 of the terminal apparatus 1'i selects terminal apparatus 1' corresponding to the level two stored in the routing table (for example, when having the routing table shown in FIG. 4, the controller 101 selects the terminal apparatus 1' having the terminal ID "1003", "1221" and "1313"), and forwards the introduction log information. Each terminal apparatus 1' receiving the forwarding further forwards the introduction log information. At this time, the controllers 101 of the terminal apparatus 1' select terminal apparatus 1' corresponding to the level three stored in the routing table, and forward the introduction log information. In this way, the terminal apparatus 1' to which to forward the introduction log information is selected at a lower level of the routing table every time it is forwarded, by which means it is possible to efficiently store the log information in a large number of terminal apparatus 1'. The method of forwarding information and a message in this way being described in Japanese Unexamined Patent Publication No. 2006-277338 applied for by the present applicant, a further description will be omitted here.

Figure 20:
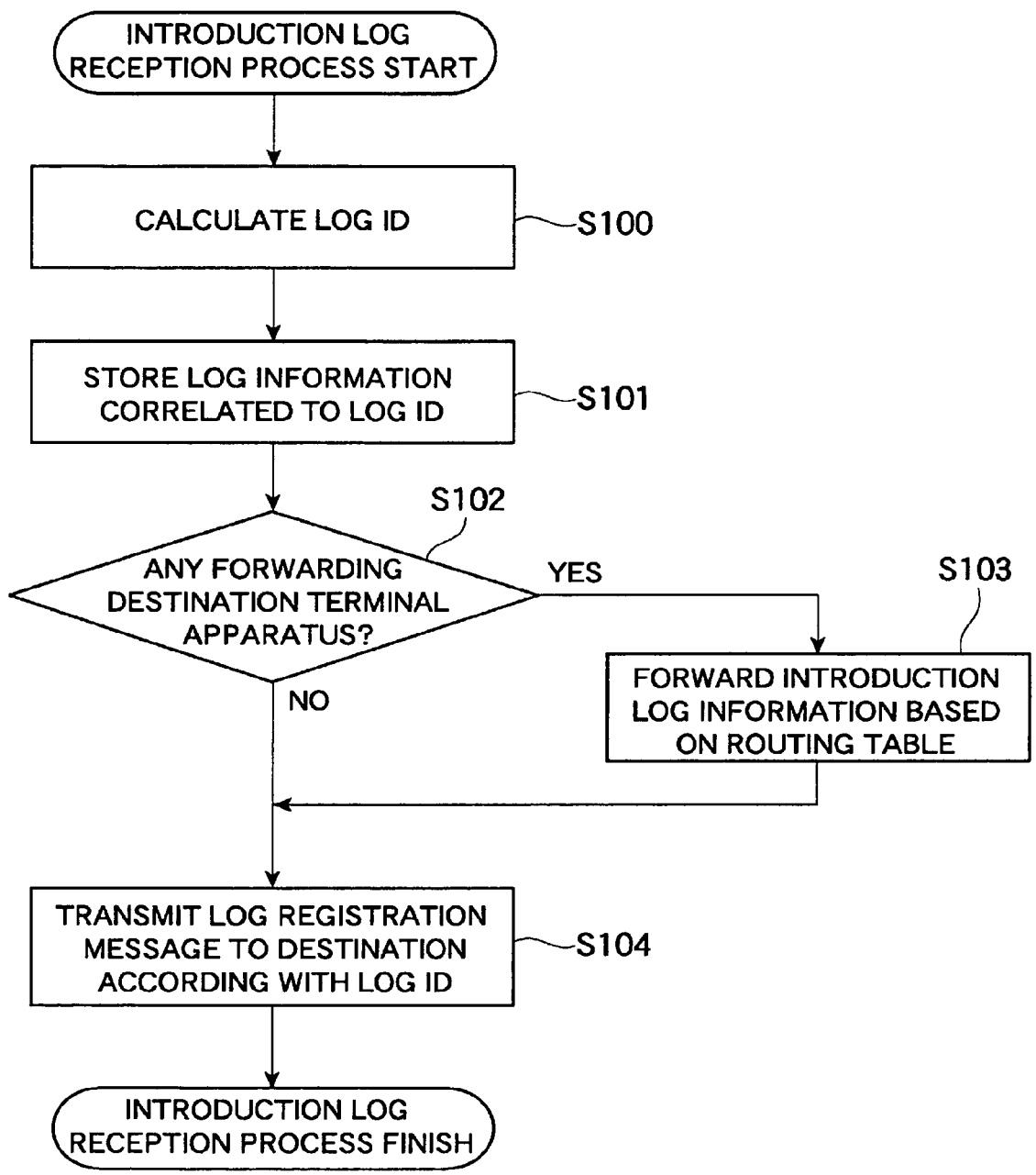
FIG. 20 is a flowchart showing operating details of an introduction log reception process of the terminal apparatus according to the second embodiment.

Herein, FIG. 20 shows a flowchart of an introduction log reception process of the terminal apparatus 1' in the present second embodiment.

As shown in FIG. 20, on starting the introduction log reception process, the controller 101, in the same way as in the heretofore described process of step S40, calculates a log ID (step S100). Subsequently, the controller 101, in the same way as in the heretofore described process of step S41, correlates the received log information to the log ID, and stores them (step S101).

Next, the controller 101 determines, based on level information, to be described hereafter, whether or not there is a forwarding destination terminal apparatus (step S102). Whether or not there is a forwarding destination terminal apparatus is judged by comparing the level information and the levels of the routing table. That is, when there are as many as four levels of the routing table, it is determined that there is no forwarding destination terminal apparatus when the level information included in the introduction log information is four.

In this process, if it is determined that there is a forwarding destination terminal apparatus (step S102: Yes), the controller 101, based on the routing table stored in the memory 102, decides on a terminal apparatus to which to forward the introduction log information, and forwards the introduction log information to the terminal apparatus, via the communication section 113 (step S103). For example, when there is no level information included in the introduction log information received, the controller 101 transmits the introduction log information to the terminal apparatus 1 stored in the level two of the routing table. Also, when the level information included in the introduction log information received is three, the controller 101 transmits the introduction log information to the terminal apparatus 1' stored in the level three of the routing table. The level information is created or changed by the terminal apparatus 1' which forwards the introduction log information. For example, when there is no level information included in the introduction log information, introduction log information with level information made three is forwarded, while when there is level information included in the introduction log information, introduction log information changed to include level information wherein the level of that level information has been lowered by one is forwarded.

When it is determined, in step S102, that there is no forwarding destination terminal apparatus (step S102: No), or when the process of step S103 is finished, the controller 101, in the same way as in the heretofore described process of step S42, transmits a log registration message to a destination according with the log ID (step S104), and finishes the introduction log reception process.

In this way, the terminal apparatus 1' in the second embodiment, causing the introduction log information to be forwarded, and causing the log information to be stored, can efficiently dispose the log holding terminal apparatus in a large number of terminal apparatus 1'.

3. Third Embodiment

In the first embodiment and second embodiment, the controller 101 transmits the location information of the log holding terminal apparatus to the terminal apparatus which is the transmission source of the log search message (the log request terminal apparatus), and the log request terminal apparatus requests a transmission of the log information from the log holding terminal apparatus but, in a third embodiment, in response to a log search message, a terminal apparatus holding the location information of the log holding terminal apparatus requests a transmission of the log information from the log holding terminal apparatus, and the log holding terminal apparatus transmits the log information directly to the log request terminal apparatus. With regard to other operations, as they are the same as the operations in the first embodiment and second embodiment, a description will be omitted here. The terminal apparatus 1" of the third embodiment being basically of the same configuration as the terminal apparatus 1 in the first embodiment and the terminal apparatus 1' in the second embodiment, the details of the information processing program stored in the internal ROM of the controller 101 are partially different.

Figure 21:
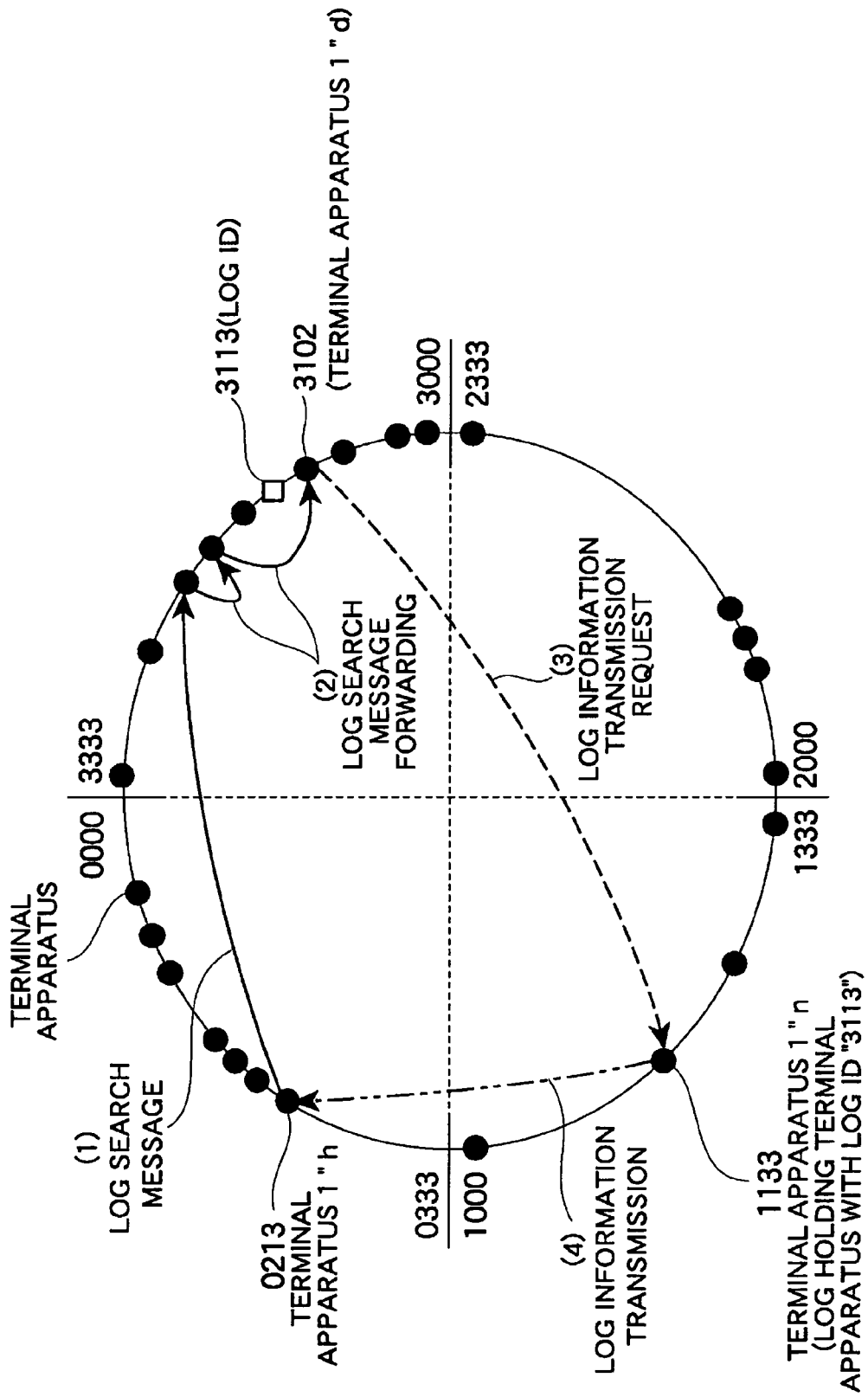
FIG. 21 is a diagram showing an example of an operation when a terminal apparatus according to a third embodiment acquires log information.

As shown in FIG. 21, for example, when a terminal apparatus 1"h transmits a log search message searching for the log ID "3113" (refer to (1) shown in FIG. 21), the log search message is forwarded by means of DHT routing, and reaches a terminal apparatus 1"d (refer to (2) shown in FIG. 21). The terminal apparatus 1"d determines whether or not the location information of the log holding terminal apparatus with the log ID indicated in the log search message received is included in the log index table stored in the memory 102. In this way, the controller 101 functions as a determination section which, when the message received is a log search message, determines whether or not the location information of the terminal apparatus holding the log information with the log ID indicated in the log search message is stored in the log index table.

In the event that it is determined that the location information of the log holding terminal apparatus with the log ID indicated in the log search message is included in the log index table stored in the memory 102, the controller 101 removes the location information of a log holding terminal apparatus 1"n with the log ID "3113" stored in the log index table of the memory 102, and requests the log holding terminal apparatus 1"n to transmit the log information with the log ID "13113" to the terminal apparatus 1"h (refer to (3) shown in FIG. 21). In this way, the controller 101 functions as an information transmission request section which, when it determines that it has the location information of the log holding terminal apparatus which is the search object of the log search message, requests the log holding terminal apparatus to transmit the log information to the terminal apparatus 1" which is the transmission source of the log search message.

The log holding terminal apparatus 1"$n$, which receives the log information transmission request, transmits the log information with the log ID "3113" stored on the hard disc 103, via the communication section 113, to the terminal apparatus 1"$h$, which is the request source (refer to (4) shown in FIG. 21). In this way, the controller 101 functions as an information transmission section which, when there has been a request from another terminal apparatus 1" to transmit log information stored on the hard disc 103, transmits the log information to the terminal apparatus 1" which is the request source.

4. Other Embodiments

Although, in the heretofore described embodiments, a description has been given separating the log information and the contents information, it is also possible to arrange in such a way as to handle the log information as one item of the contents information. At this time, the log ID, the log index table, the log search message, the log registration message, and the like, become unnecessary, and the log information is processed in the same way as the contents information. By so doing, a dividing up of the log information and contents information becomes unnecessary, and the process becomes easy.

However, it is necessary to arrange in such a way that a contents ID which is the identification information of the log information does not duplicate a contents ID which is the identification information of another item of contents information. Consequently, a duplication of the identification information is avoided by, for example, arranging in such a way that, in the case of the log information, a number headed by "1" is hashed, while for contents information other than the log information, a number headed by "0" is hashed.

The contents information including the log information is stored on the hard disc 103 (corresponding to one example of an information storage section). Also, the controller 101, acting as the registration message transmission section, with identification information allotted to the contents information, including the log information, stored on the hard disc 103, as destination identification information, transmits a registration message including the location information of its own apparatus, based on the routing table. Also, the controller 101, acting as the search message transmission section, with identification information (contents ID) allotted to the contents information, including the log information, stored by another terminal apparatus as destination identification information, transmits a search message searching for a terminal apparatus which holds the contents information including the log information, based on the routing table. Also, the controller 101, acting as the information acquisition section, acquires the contents information including the log information from the terminal apparatus searched for with the search message.

Heretofore, a detailed description has been given, based on the drawings, of some embodiments of the invention but, these are illustrations, and it is possible to implement the invention in other embodiments incorporating various modifications and improvements based on knowledge of those skilled in the art.

For example, in the heretofore described embodiments, it is arranged in such a way that a log request terminal apparatus or contents request terminal apparatus acquires one item of log information or contents information from one log holding terminal apparatus or contents holding terminal apparatus, but it is also acceptable to arrange in such a way that, by acquiring one portion of log information or contents information from, respectively, two or more log holding terminal apparatus or contents holding terminal apparatus, as a result, one item of log information or contents information is acquired from two or more log holding terminal apparatus or contents holding terminal apparatus.

Also, as the location information of the terminal apparatus, a description has been given of the IP address as an example but, it is also acceptable to have location information including a port number in addition to the IP address, and it is sufficient that it is information which can specify a position in the network.

Also, in each terminal apparatus 1, it is also acceptable to arrange in such a way that identical log information is regularly introduced to another terminal apparatus 1. In this case, it is also acceptable to arrange in such a way that the controller 101 of each terminal apparatus 1, after storing the location information of the log holding terminal apparatus in the log index table, deletes the location information of the log holding terminal apparatus stored in the log index table when it does not receive a further registration message from the log holding terminal apparatus within a predetermined period. By so doing, for example, when the log holding terminal apparatus withdraws from the information distribution system S, or the like, it is possible to avoid notifying of the location information of the log holding terminal apparatus. In this way, it is also acceptable to arrange in such a way that the controller 101 functions as a location information deletion section which, after storing the location information of another terminal apparatus 1 in the log index table, deletes the location information of the other terminal apparatus 1 stored in the log index table when it does not receive a following registration message from the other terminal apparatus 1 within a predetermined period.

Although the embodiment and modification of the present invention have been described in detail herein, the scope of the invention is not limited thereto. It will be appreciated by those skilled in the art that various modifications may be made without departing from the scope of the invention. Accordingly, the embodiment and modification disclosed herein are only exemplary. It is to be understood that the scope of the invention is not to be limited thereby, but is to be determined by the claims which follow.

What is claimed is:

1. A first terminal apparatus of a plurality of terminal apparatuses that are mutually connected via a network, the plurality of terminal apparatuses being allotted unique first identification information, the first terminal apparatus carrying out a transmission and reception of contents information among the plurality of terminal apparatuses via an overlay network that is formed by the plurality of terminal apparatuses, the first terminal apparatus comprising:

a routing table storage section configured to store a routing table that includes first identification and first location information of terminal apparatuses constituting a portion of the plurality of terminal apparatuses, the first location information being indicative of a location of a respective terminal apparatus of the portion of the plurality of terminal apparatuses, the first identification and first location information being correlated with each other;

an information transmission section which transmits operation history data of the first terminal apparatus to at least one of the plurality of terminal apparatuses connected to the overlay network;

an information receiving section which receives operation history data of another of the plurality of terminal apparatuses, transmitted from the another terminal apparatus;

an information storage section which stores the operation history data received by the information receiving section;

a registration message transmission section which, in response to storing the operation history data in the information storage section, transmits a registration message which includes second identification information, which is allotted to the operation history data stored in the information storage section and identifies the operation history data stored in the information storage section and second location information indicative of a location of the first terminal apparatus storing the operation history data, to at least one of the plurality of terminal apparatuses connected to the overlay network; and a location information storage section which, in response to receiving a registration message via the network, stores the second location information and the second identification information included in the registration message received via the network, wherein the stored second location information and the stored second identification information are allowed to be referenced by the plurality of terminal devices connected to the overlay network.

2. The first terminal apparatus according to claim 1, further comprising:
a search message transmission section which transmits a search message including the second identification information allotted to the operation history data stored by the another terminal apparatus and being used for searching for a terminal apparatus holding the operation history data stored by the another terminal apparatus, to at least one of the terminal apparatuses connected to the overlay network; and
an information acquisition section which acquires the operation history data stored in the another terminal apparatus from the terminal apparatus searched for with the search message.

3. The information distribution system according to claim 1, wherein the apparatus information transmission section selects one of the plurality of terminal apparatuses whose first location information is stored in the routing table storage section, and transmits the operation history data of the first terminal apparatus to the selected terminal apparatus.

4. The information distribution system according to claim 1, wherein the apparatus information transmission section, with the first identification information of one or more terminal apparatuses among the plurality of terminal apparatuses as destination identification information, transmits the operation history data of the first terminal apparatus, based on the information stored in the routing table storage section.

5. The first terminal apparatus according to claim 1, further comprising:
an identification information generation section which, when storing in the information storing section, the operation history received by the information receiving section allots the second identification information to the operation history data received by the information receiving section, based on the first identification information of the another terminal apparatus, and on a date of the operation history received by the information receiving section.

6. The first terminal apparatus according to claim 1, further comprising:

a location information deletion section which, after storing the second location information of the another terminal apparatus in the location information storage section, deletes the location information of the another terminal apparatus stored in the information storage section when a predetermined period has elapsed.

7. The first terminal apparatus according to claim 1, wherein at least one of an acquisition time of the contents information, a transmission time of the contents information, a reproduction time of the contents information, and error information of each kind of process, in the first terminal apparatus is included in the operation history data received by the information receiving section.

8. The first terminal apparatus according to claim 2, further comprising:
a determination section which, in response to receiving the search message via the network, determines whether or not third location information indicative of a location of a terminal apparatus which is a search object of the search message is stored in the location information storage section; and
a location information transmission section which, in response to the determination by the determination section that the third location information is stored, transmits the third location information to a terminal apparatus which is a transmission source of the search message.

9. The first terminal apparatus according to claim 2, further comprising:
a determination section which, in response to receiving the search message via the network, determines whether or not third location information indicative of a location of a terminal apparatus which is a search object of the search message is stored in the location information storage section;
an information transmission request section which, in response to the determination by the determination section that the third location information is stored, requests the terminal apparatus that is the search object of the search message to transmit the operation history data stored by the terminal apparatus that is the search object of the search message to a terminal apparatus which is a transmission source of the search message; and
an information transmission section which, when there has been a request from one of the plurality of terminal apparatuses to transmit the operation history data stored in the information storage section, transmits the operation history data stored in the information storage section to a terminal apparatus which is a request source.

10. The first terminal apparatus according to claim 3, wherein the apparatus information transmission section makes the number of the other terminal apparatuses selected two or more.

11. The first terminal apparatus according to claim 3, wherein the apparatus information transmission section randomly selects, from terminal apparatuses whose first location information are stored in the routing table storage section, a terminal apparatus to which to transmit the operation history data of the first terminal apparatus.

12. A non-transitory recording medium on which an information processing program, which causes a computer to function as each section of the first terminal apparatus according to claim 1, is stored so as to be readable by the computer.

13. An information processing method of a first terminal apparatus in an information distribution system which, by an overlay network which is formed by a plurality of terminal apparatuses which are mutually connected via a network and to which unique first identification information is allotted, carries out a transmission and reception of contents information among the plurality of terminal apparatuses, the first terminal apparatus including a routing table storage section configured to store a routing table that includes first identification and first location information of terminal apparatuses constituting a portion of the plurality of terminal apparatuses, the first location information being indicative of a location of a respective terminal apparatus of the portion of the plurality of terminal apparatuses, the first identification and first location information being correlated with each other, the method comprising the steps of:

transmitting operation history data of the first terminal apparatus to at least one of the plurality of terminal apparatuses connected to the overlay network;

receiving operation history data of another terminal apparatus, transmitted from the another terminal apparatus;

storing the operation history data of the another terminal apparatus received by the information receiving section;

transmitting, in response to storing the operation history data received by the information receiving section in the information storage section, a registration message which includes second identification information which is allotted to the operation history data received by the information receiving section and identifies the operation history data received by the information receiving section and second location information indicative of a location of the first terminal apparatus storing the operation history data received by the information receiving section, to at least one of terminal apparatuses connected to the overlay network; and storing, in response to receiving a registration message via the network, second location information and second identification information included in the registration message, wherein the stored second location information and the stored second identification information are allowed to be referenced by the plurality of terminal devices connected to the overlay network.

14. A non-transitory recording medium on which an information processing program, which causes a computer to function as each section of a first terminal apparatus, is stored so as to be readable by the computer, the first terminal apparatus being part of a plurality of terminal apparatuses that are mutually connected via a network, the plurality of terminal apparatuses being allotted unique first identification information, the first terminal apparatus carrying out a transmission and reception of contents information among the plurality of terminal apparatuses via an overlay network that is formed by the plurality of terminal apparatuses, the first terminal apparatus including a routing table storage section configured to store a routing table that includes first identification and first location information of terminal apparatuses constituting a portion of the plurality of terminal apparatuses, the first location information being indicative of a location of a respective terminal apparatus of the portion of the plurality of terminal apparatuses, the first identification and first location information being correlated with each other, the information processing program comprising the steps of:

transmitting operation history data of the first terminal apparatus to at least one of the plurality of terminal apparatuses connected to the overlay network;

receiving operation history data of another terminal apparatus, transmitted from the another terminal apparatus;

storing the operation history data of the another terminal apparatus received by the information receiving section;

transmitting, in response to storing in the information storage section, the operation history data received by the information receiving section, a registration message which includes second identification information which is allotted to the operation history data received by the information receiving section and identifies the operation history data received by the information receiving section and second location information indicative of a location of the first terminal apparatus storing the operation history data received by the information receiving section, to at least one of terminal apparatuses connected to the overlay network; and storing, in response to receiving a registration message via the network, the second location information and the second identification information included in the registration message, wherein the stored second location information and the stored second identification information are allowed to be referenced by the plurality of terminal devices connected to the overlay network.

\* \* \* \* \*